US009269331B2

(12) United States Patent
Ishizawa

(10) Patent No.: US 9,269,331 B2
(45) Date of Patent: Feb. 23, 2016

(54) INFORMATION PROCESSING APPARATUS WHICH COOPERATES WITH OTHER APPARATUS, AND INFORMATION PROCESSING SYSTEM IN WHICH A PLURALITY OF INFORMATION PROCESSING APPARATUSES COOPERATES

(71) Applicant: CANON KABUSHIKI KAISHA, Tokyo (JP)

(72) Inventor: Masayuki Ishizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 14/088,940

(22) Filed: Nov. 25, 2013

(65) Prior Publication Data
US 2014/0145988 A1 May 29, 2014

(30) Foreign Application Priority Data

Nov. 26, 2012 (JP) ................................. 2012-257555
Nov. 15, 2013 (JP) ................................. 2013-236737

(51) Int. Cl.
G09G 5/12 (2006.01)
G09G 5/00 (2006.01)
H04L 29/08 (2006.01)
G06F 3/14 (2006.01)
G06F 1/16 (2006.01)
G06F 3/01 (2006.01)
G06F 3/0488 (2013.01)

(52) U.S. Cl.
CPC .............. *G09G 5/12* (2013.01); *G06F 1/1694* (2013.01); *G06F 1/1698* (2013.01); *G06F 3/017* (2013.01); *G06F 3/04883* (2013.01); *G06F 3/1446* (2013.01); *G09G 5/006* (2013.01); *H04L 67/06* (2013.01); *G09G 2354/00* (2013.01); *G09G 2356/00* (2013.01)

(58) Field of Classification Search
CPC ..... G06F 3/041; G06F 3/0416; G06F 3/0412; G06F 3/04883; G06F 3/016; G06F 3/0488
See application file for complete search history.

(56) References Cited

U.S. PATENT DOCUMENTS

| 2005/0093868 A1* | 5/2005 | Hinckley ...................... 345/502 |
| 2005/0219211 A1* | 10/2005 | Kotzin et al. ................. 345/158 |
| 2007/0146347 A1* | 6/2007 | Rosenberg .................... 345/173 |
| 2011/0136544 A1 | 6/2011 | Ge |
| 2011/0163944 A1* | 7/2011 | Bilbrey et al. ................ 345/156 |

FOREIGN PATENT DOCUMENTS

| CN | 102646117 A | 8/2012 |
| JP | 2010-257259 A | 11/2010 |
| JP | 2010-262330 A | 11/2010 |

OTHER PUBLICATIONS

Takashi Ohta et al., "Pinch: An Interface that Relates Application on Multiple Touch-Screen by "Pinching" Gesture", Jan. 1, 2012, Advances in Computer Entertainment Lecture Notes in Computer Science, pp. 320-335, XP009176351.
Fromdecimateddreams, "Tony Stark and Bruce Banner Lab Scene (The Avengers)", Aug. 15, 2012, XP054975343, Retrieved from internet: URL: http://www.youtube.com/watch?v=35N©j5T0J_8.
Tanaka et al., "Multi-Smartphone-Display Applications that React Dynamically to Display's Layout", IPSJ Interaction, Mar. 17, 2012, pp. 1013-1018.

* cited by examiner

*Primary Examiner* — Olga Merkoulova
(74) *Attorney, Agent, or Firm* — Canon USA Inc. IP Division

(57) ABSTRACT

The present invention is directed to providing, in a plurality of information processing apparatuses which transmits and receives objects, a technique for causing the display contents in the apparatuses to be related by the apparatuses performing simple exchange of information. An information processing apparatus includes a display control unit configured to cause, based on the information on the azimuth direction in which an object displayed on a screen has been moved, from other apparatus that transmits the information and the information indicating the azimuth direction in which the screen of the information processing apparatus has been directed, an object which is the same as an object displayed on a screen of the other apparatus to appear from an azimuth direction opposite of the azimuth direction in which the object displayed on the screen of the other apparatus has been moved, in the screen of the information processing apparatus.

18 Claims, 14 Drawing Sheets

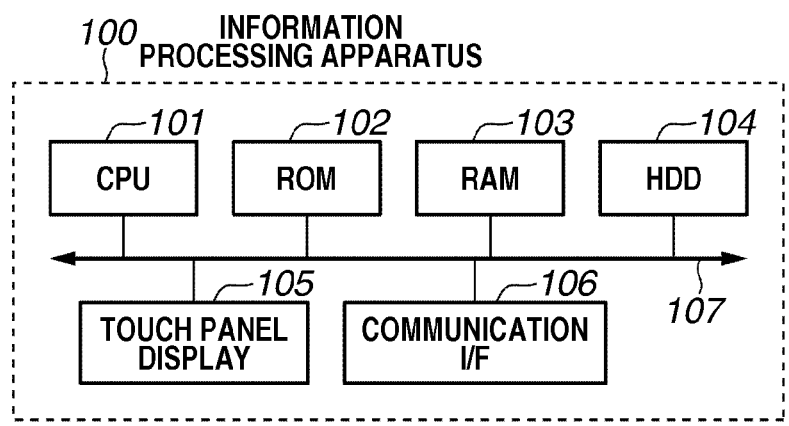
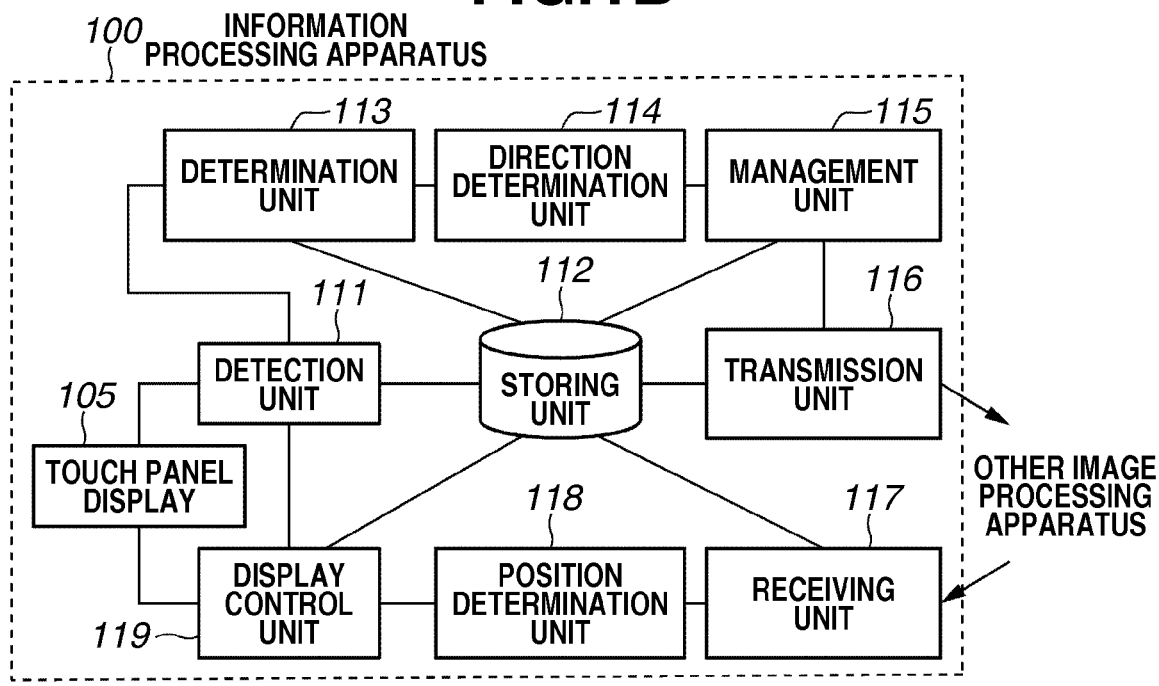
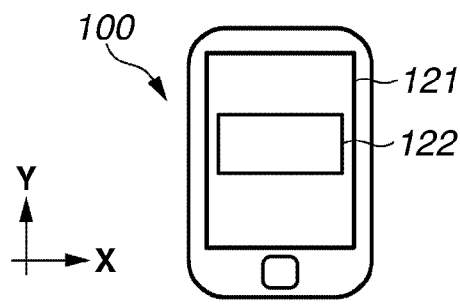

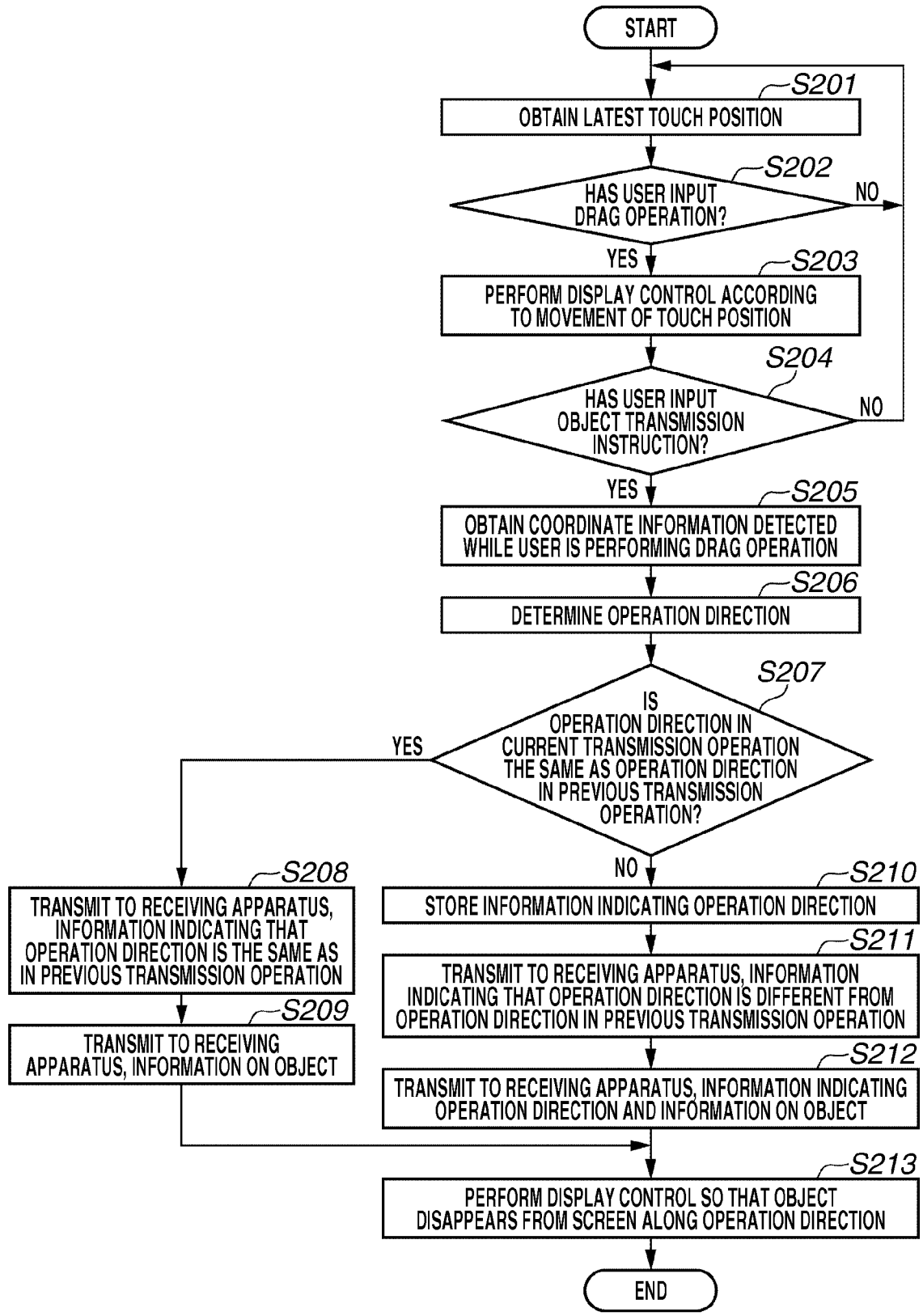

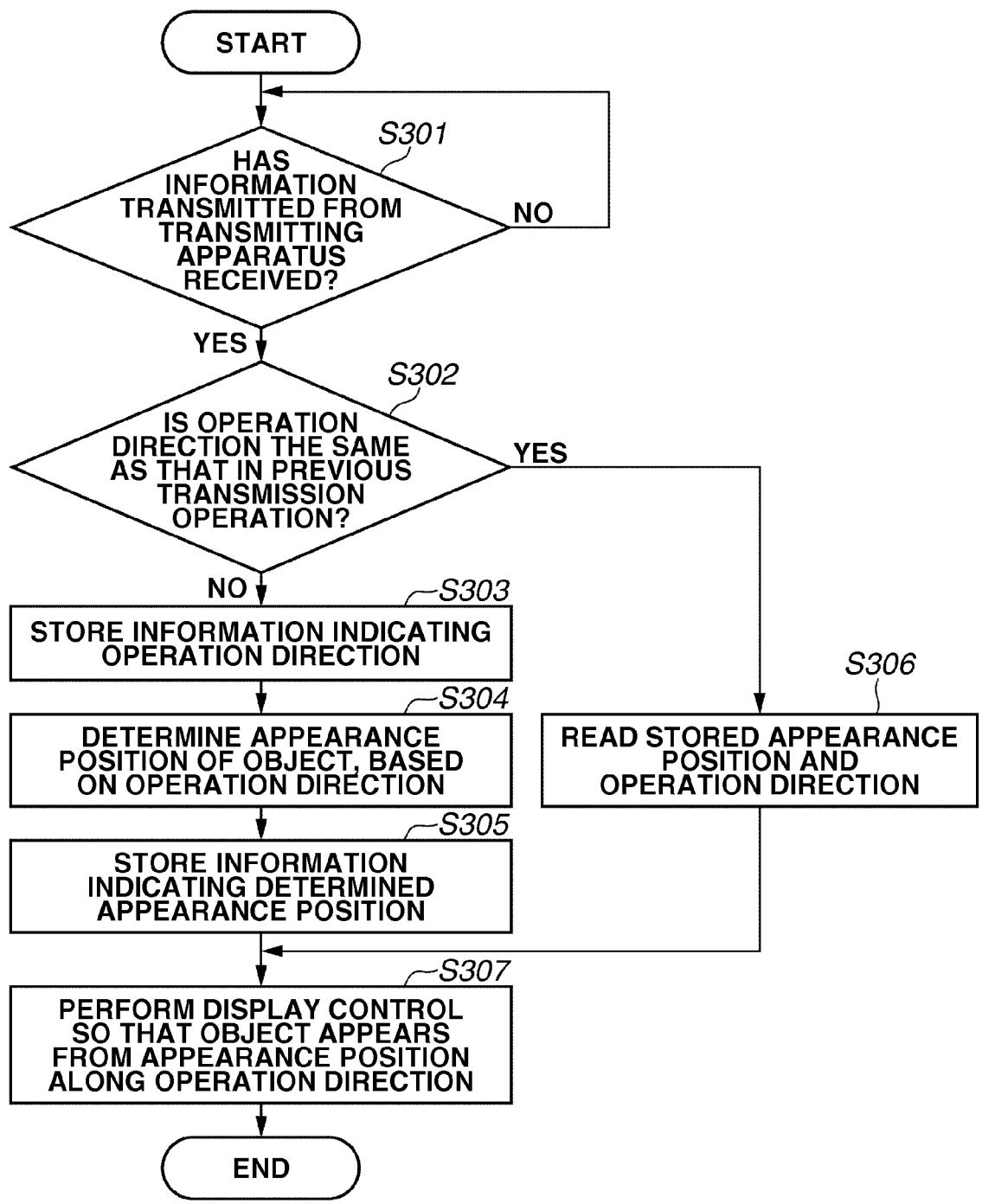

|  | TIME | COORDINATE DATA OF DRAG |
|---|---|---|
| Pe | Te | (Xe, Ye) |
| Pd | Td | (Xd, Yd) |
| Pc | Tc | (Xc, Yc) |
| Pb | Tb | (Xb, Yb) |
| Pa | Ta | (Xa, Ya) |

| FINAL POSITION | APPEARANCE POSITION 1 | APPEARANCE POSITION 2 |
|---|---|---|
| 802 | 806 | 808 |
| 803 | 807 | 807 |
| 804 | 808 | 806 |
| 805 | 809 | 809 |
| 806 | 802 | 804 |
| 807 | 803 | 803 |
| 808 | 804 | 802 |
| 809 | 805 | 805 |

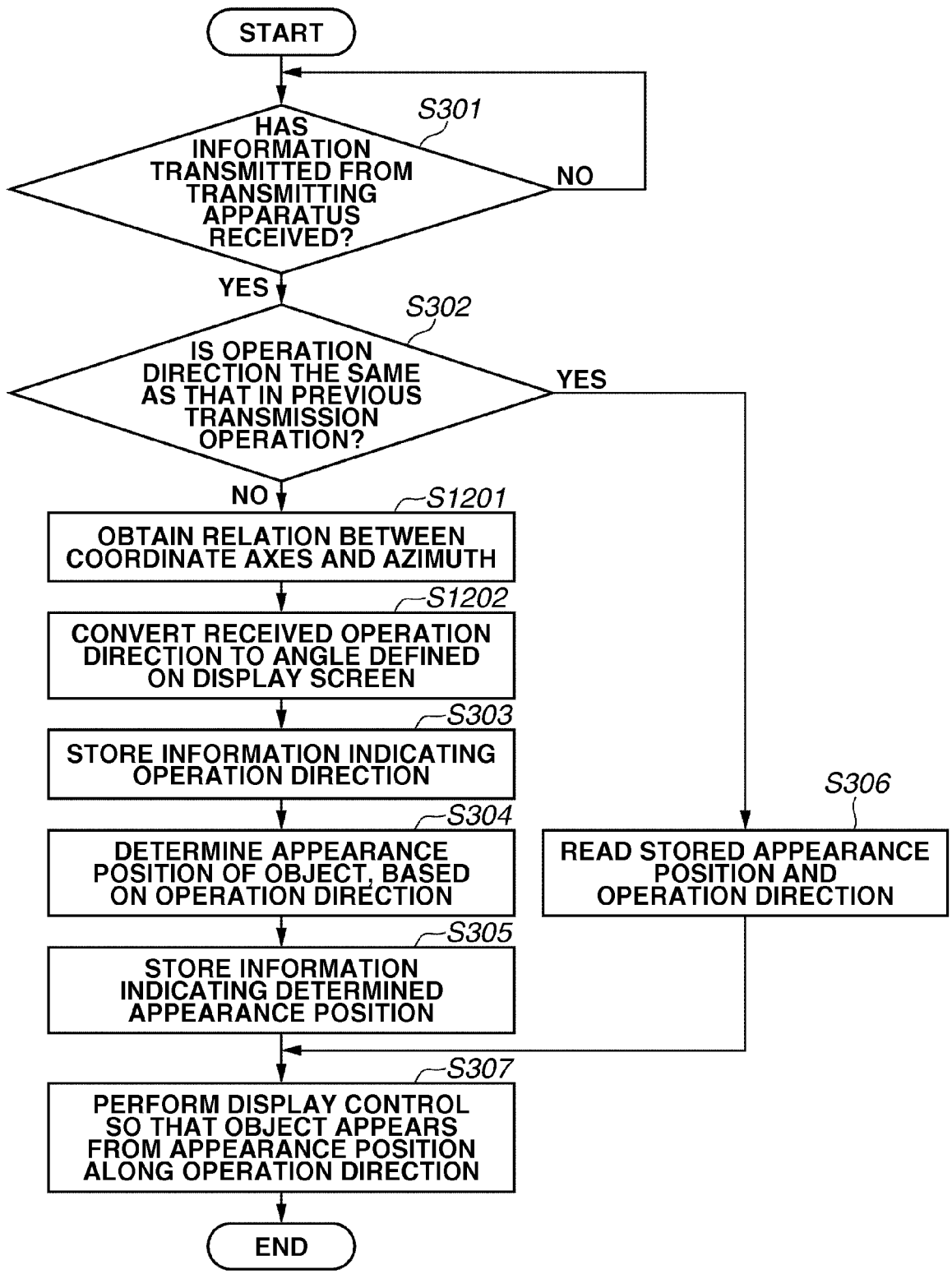

INFORMATION PROCESSING APPARATUS WHICH COOPERATES WITH OTHER APPARATUS, AND INFORMATION PROCESSING SYSTEM IN WHICH A PLURALITY OF INFORMATION PROCESSING APPARATUSES COOPERATES

BACKGROUND OF THE INVENTION

1. Field of the Invention

The present invention relates to a technique for causing display contents of a plurality of information processing apparatuses to be related.

2. Description of the Related Art

There is a technique for causing a plurality of display devices to cooperate and be virtually used as one large display device. For example, if the plurality of display devices is to be used as one display device in a personal computer (PC), an arrangement of the display devices is preset on the PC. Display output to each of the display devices is controlled according to the information on the set arrangement.

Further, in recent years, information processing apparatuses such as a tablet PC have become widely-used. "Multi-Smartphone-Display Applications that React Dynamically to Display's Layout, Information Processing Society of Japan Interaction 2012" discusses the following technique. The technique assumes that screens in two information processing apparatuses are screens in the same space, and relates the contents of displayed images. More specifically, a pinch operation bridging over two screens is input to the two information processing apparatuses. As a result, a relation between positions in which the information processing apparatuses are arranged is set, so that the display images in the respective apparatuses are related.

However, according to the technique discussed in "Multi-Smartphone-Display Applications that React Dynamically to Display's Layout, Information Processing Society of Japan Interaction 2012", it becomes necessary to input the pinch operation over the two screens every time an orientation of at least one of the information processing apparatuses changes.

SUMMARY OF THE INVENTION

The present invention is directed to a technique capable of, in a plurality of information processing apparatuses which transmits and receives objects, relating to one another the display contents in the apparatuses by a simple exchange of information performed between the apparatuses.

Further features of the present invention will become apparent from the following detailed description of exemplary embodiments with reference to the attached drawings.

BRIEF DESCRIPTION OF THE DRAWINGS

FIGS. 1A, 1B, and 1C illustrate an example of a configuration of an information processing apparatus.

FIG. 2 is a flowchart illustrating an example of a process for transmitting an object performed by the information processing apparatus.

FIG. 3 is a flowchart illustrating an example of a process for receiving the object performed by the information processing apparatus.

FIG. 12 is a flowchart illustrating an example of a process for receiving the object performed by the information processing apparatus.

DESCRIPTION OF THE EMBODIMENTS

Figures 4A, 4B:
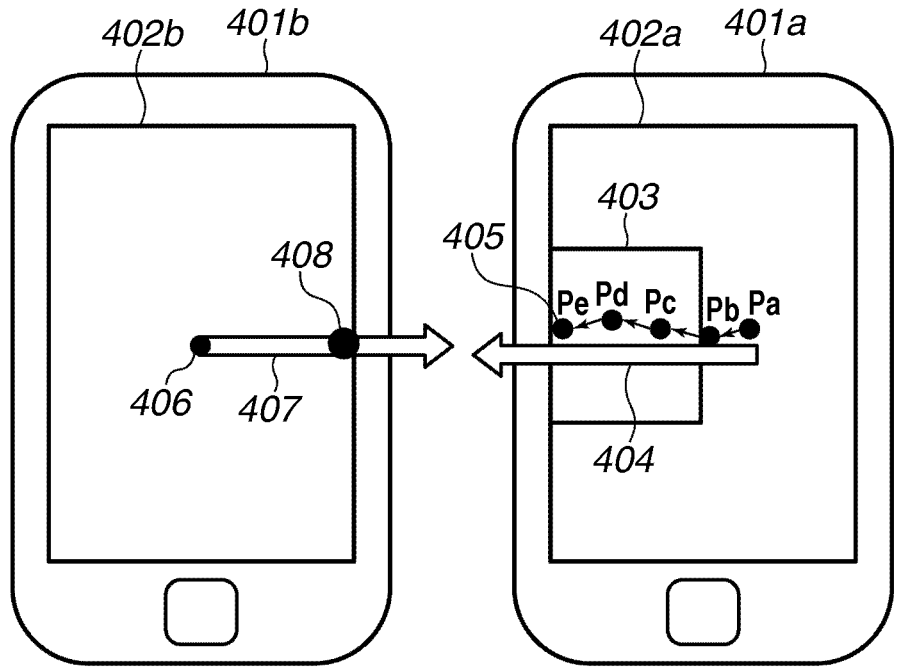
FIGS. 4A and 4B illustrate examples of a process for determining an operation direction and a process for determining an appearance position.

Various exemplary embodiments, features, and aspects of the invention will be described in detail below with reference to the drawings. However, these exemplary embodiments are just examples and not intended to limit the scope of the present invention.

FIGS. 1A, 1B, and 1C illustrate the configuration of an information processing apparatus 100 according to a first exemplary embodiment of the present invention. According to the present exemplary embodiment, an information processing system including a plurality of information processing apparatuses 100 will be described as an example. More specifically, the information processing apparatuses 100 function as a transmitting apparatus which transmits an operation target or a receiving apparatus which receives the transmitted operation target.

FIG. 1A illustrates an example of a hardware configuration of the information processing apparatus 100 according to the present exemplary embodiment. Referring to FIG. 1A, a central processing unit (CPU) 101 performs calculations and logical decisions for various processes, and controls each element connected to a system bus 107.

The information processing apparatus 100 includes memories such as a program memory and a data memory. More specifically, a read-only memory (ROM) 102, i.e., a program memory, stores programs for the CPU to perform control, which includes various processing procedures to be described below. Further, a random access memory (RAM) 103, i.e., a data memory, includes a work area for the CPU 101 to execute the above-described programs, a data save area used for performing error processing, and a load area of the above-described control program. The program memory may also be realized by loading the programs from an external storage device connected to the information processing apparatus 100 to the RAM 103.

A hard disk (HD) 104 is used for storing a plurality of data and programs according to the present exemplary embodiment. The external storage device may also be used for performing a similar function as the HD 104. For example, the external storage device may be realized by a medium (i.e., a recording medium) and an external storage drive for accessing to the medium.

Examples of the medium are a flexible disk (FD), a compact disk (CD)-ROM, a digital versatile disk (DVD), a universal serial bus (USB) memory, a magnetooptic disk (MO), and a flash memory. Further, the external storage device may be a server connected via a network.

A touch panel display 105 is a device which functions as both a touch sensor for receiving user operation information in an input area 122 and a display screen for performing display output. A communication interface (I/F) 106 performs, using a known communication technique, wired or wireless connection with other information processing apparatus and the external storage device. The communication I/F 106 thus realizes bi-directional transmission and reception of the information. Connection with the other information processing apparatuses may be performed by direct communication, or by indirect communication using a relaying apparatus.

FIG. 1B is a block diagram illustrating an example of the functional configuration of the information processing apparatus 100 according to the present exemplary embodiment. Referring to FIG. 1B, the information processing apparatus 100 includes a detection unit 111, a determination unit 113, a direction determination unit 114, a management unit 114, a position determination unit 118, and a display control unit 119. Each of the functional units is realized by the CPU 101 loading in the RAM 103 the program stored in the ROM 102 and executing the process according to each of the flowcharts to be described below.

A transmission unit 116 and a receiving unit 117 are similarly realized by the CPU 101, the ROM 102, the RAM 103, and the communication I/F 106 operating in cooperation with each other. According to the present exemplary embodiment, a storing unit 112 in the information processing apparatus 100 is a functional unit of the RAM 103. The present invention may be similarly realized by the information processing apparatus which realizes the above-described functional units using hardware. Each of the elements will be described below.

The detection unit 111 detects a touch position touched by the user on a touch panel. According to the present exemplary embodiment, the detection unit 111 is notified each time the information on a detected touch position on the touch panel display 105, i.e., an input unit, is obtained at regular intervals. More specifically, according to the present exemplary embodiment, the detection unit 111 is notified of the touch position as coordinates indicating one point that has been identified. The detection unit 111 then stores in the storing unit 112 coordinate information indicating the touch position on the screen of the touch panel display 105 each time the notification is received.

Further, the detection unit 111 is capable of detecting a drag operation (i.e., an operation in which the user moves a finger while touching the touch panel) and a flick operation (i.e., an operation in which the user quickly separates from the touch panel the finger touching the touch panel as if flicking at high speed). The detection unit 111 detects the drag operation and the flick operation based on a change in the coordinates due to a movement of the detected touch position.

The determination unit 113 controls execution of the processes by the direction determination unit 114, the management unit 115, and the transmission unit 116, according to the information on a latest touch position detected by the detection unit 111.

The direction determination unit 114 determines the operation direction instructed by a user touch operation, based on transition of the coordinate information on the touch position stored in the storing unit 112. Further, the direction determination unit 114 stores in the storing unit 112 the information indicating the determined operation direction.

The management unit 115 manages the information to be transmitted by the transmission unit 116. In such a case, the management unit 115 determines whether a transmission operation has been repeated in the same direction. The management unit 115 determines based on a result of comparing, among the information stored in the storing unit 112, the direction information determined in a previous process, and the latest direction information determined by the direction determination unit 114. The management unit 115 then determines the information to be transmitted by the transmission unit 116 according to the determination result.

The transmission unit 116 transmits, according to the determination of the management unit 115, the direction information based on the operation direction determined by the direction determination unit 114, to the other information processing apparatus (i.e., the receiving apparatus). According to the present exemplary embodiment, the direction information based on the operation direction is either of the following. The direction information is the information on the operation direction determined by the direction determination unit 114 indicated by an angle, or flag information indicating that the operation direction determined by the direction determination unit 114 is the same direction as in the previous process.

Furthermore, the transmission unit 116 transmits to the other information processing apparatus (i.e., the receiving apparatus), the information on the object to be transmitted and received. The information on the object includes image information necessary for rendering the object, electronic data corresponding to the object, and identification information and information on a browsing authority thereof.

According to the present exemplary embodiment, an example in which the object to be transmitted and received is a thumbnail image of the image data will be described below.

The transmitting apparatus and the receiving apparatus transmit and receive the thumbnail image, and thus cause the display contents to be related according to the touch operation as will be described below. Further, the image data corresponding to the thumbnail image is stored in a storing unit in the information processing apparatus 100, and is transmitted and received at the same time as the thumbnail image is being display-controlled, as will be described below.

As described above, according to the present exemplary embodiment, the display contents in the plurality of information processing apparatuses are related to promptly respond to the user operation. Further, the plurality of information processing apparatuses transmits and receives the actual image data corresponding to the thumbnail image. The user can thus intuitively recognize the movement of the electronic data.

The image data corresponding to the thumbnail image may be stored in the external storage device connected to the information processing apparatus 100 via the network. The image data may thus be downloaded from the external storage device to the receiving apparatus after the receiving apparatus completes reception of the thumbnail image. Further, the browsing authority of the image data stored in the external storage device may be provided to the receiving apparatus in response to the receiving apparatus receiving the thumbnail image.

With the above-described configuration, the amount of information to be transmitted and received can be reduced. The object is not limited to the thumbnail image of the image data, and an icon image corresponding to an application file (i.e., electronic data) may be transmitted and received as the object. The object and the electronic data corresponding to the object are thus not limited, and the present exemplary embodiment is applicable to various operation targets.

The receiving unit 117 receives the information transmitted from the transmission unit 116 in the other information processing apparatus (i.e., the transmitting apparatus).

The position determination unit 118 estimates a positional relation between the information processing apparatus (i.e., the receiving apparatus) and the information processing apparatus which has transmitted the received information (i.e., the transmitting apparatus). The position determination unit 118 estimates the positional relation based on the information indicating the operation direction received by the receiving unit 117. The positional determination unit 118 then determines the appearance position of the object on the screen in the receiving apparatus for displaying the object as if continuously moving across boundaries of the screens in the transmitting apparatus and the receiving apparatus.

The display control unit 119 generates the display image to be output on the touch panel display 105, and controls the display content. According to the present exemplary embodiment, the display control unit 119 displays, if the touch position detected on the object is moved while the object is displayed on the screen, the object to be moving following the movement of the touch position.

Further, if the determination unit 113 causes the direction determination unit 114, the management unit 115, and the transmission unit 116 to execute the respective processes, the display control unit 119 causes the displayed object to disappear from the screen along the direction determined by the direction determination unit 114. Furthermore, if an object is received from other information processing apparatus, the display control unit 119 causes the received object to be displayed to appear on the screen. The object appears on the screen from the position determined by the position determination unit 118 along the direction determined by the direction determination unit 114.

FIG. 1C is an external view illustrating an example of the information processing apparatus 100 according to the present exemplary embodiment. Referring to FIG. 1C, a screen 121 corresponds to a display area in the touch panel display 105, and also an input area in which a touch input of the user is detectable. The screen 121 displays an object 122, and the user can perform the touch operation on the object 122.

According to the present exemplary embodiment, the touch position is indicated based on a coordinate plane in which an X-axis and a Y-axis are defined according to an origin set at the lower left of the screen 121. For example, if a width and a height of a screen resolution of the screen 121 are respectively Wt dots and Ht dots, the detection unit 101 obtains the coordinate information as follows. The coordinate information is obtained by setting the origin at the lower left of the screen, and using the coordinate plane which expresses the entire screen by X coordinates from 0 to Wt dots and Y coordinates from 0 to Ht dots.

According to the present exemplary embodiment, the plurality of information processing apparatuses which transmits and receives the object is executing the same application. As a result, the plurality of information processing apparatuses can identify each other and perform communication. When the application is in a transmission mode, the user touches the object displayed on the screen, and drags the object in the direction of the apparatus to which the object is to be transmitted (i.e., the receiving apparatus) exists. The user thus inputs an object transmission instruction operation corresponding to the object.

Display control is then performed in the receiving apparatus executing the same application in a receiving mode, so that the received object appears from the direction in which the transmitting apparatus exists with respect to the screen of the receiving apparatus. As a result, the two display screens form one display screen as if connected together, and the object is display-controlled to continuously move within the connected screens. The user can thus intuitively recognize the movement of the object corresponding to the object between the apparatuses. It is not necessary for the transmission mode and the receiving mode to be separate modes.

The method for determining the information processing apparatus to communicate with may be any of the following methods. Techniques such as Near field communication (NFC) and TransferJet may be used, the apparatuses may be caused to contact each other, or the apparatus to communicate with may be previously determined in each of the apparatuses. Further, other methods may be employed, such as recognizing, when it is detected that the two apparatuses are shaken at the same time, the other apparatus as a communication partner.

However, according to the first exemplary embodiment, the object transmission and reception are only performed in the following state. The transmitting apparatus executing the transmission mode and the receiving apparatus executing the receiving mode are arranged so that up, down, right, and left of the displays in the respective screens match.

The specific processes performed by each of the transmitting apparatus and the receiving apparatus according to the present exemplary embodiment will be described below with reference to the flowcharts illustrated in FIGS. 2 and 3. According to the present exemplary embodiment, it is assumed that the plurality of information processing apparatuses which transmits and receives the object is executing the same application. The plurality of information processing apparatuses is thus previously capable of identifying and communicating with each other, and is standing by for the object transmission and reception operations to be performed.

FIG. 2 is a flowchart illustrating an example of the process for transmitting the object performed by the information processing apparatus 100 according to the present exemplary embodiment. The information processing apparatus 100 executes the process of the flowchart illustrated in FIG. 2 in the following state. The apparatus performs the process when at least one object is being displayed at the center of the screen in the information processing apparatus 100 set to the transmission mode, and the input I/F 106 notifies that the user has touched the object.

In step S201, the detection unit 111 obtains the information on the latest touch position. More specifically, the detection unit 111 obtains at least a touch event indicating that the touch operation has been detected or that the user has released the touch position and the coordinate information on the touch position when the touch event has been issued. The detection unit 111 then stores in the storing unit 112 the coordinate information. The detection unit 111 adds to the information stored in the storing unit 112, the coordinates indicating the touch positions from when detecting the touch operation to detecting that the user has released the touch position. If the detection unit 111 detects the event indicating that the user has released the touch position, the stored information is initialized.

In step S202, the detection unit 111 determines whether the user has input the drag operation. According to the present exemplary embodiment, if the user has moved the touch position a predetermined distance or more without releasing the touch position, the detection unit 111 determines that the user has input the drag operation. The detection unit 111 thus calculates the moving distance of the touch position from the distance between the coordinates of when initially detecting the touch position and the coordinates obtained in the latest detection. The detection unit 111 then compares the calculated moving distance with a predetermined value.

If the value of the predetermined value is 0 dots, the detection unit 111 recognizes that the drag operation has been input when detecting the movement of the touch position. If the detection unit 111 determines that the user has input the drag operation (YES in step S202), the process proceeds to step S203. On the other hand, if the detection unit 111 determines that the user has not input the drag operation (NO in step S202), the process returns to step S201.

In step S203, the display control unit 119 performs control to move, according to the movement of the detected touch position, the display position of the displayed object 122. More specifically, the display control unit 119 generates the display image in which the object 122 moves following the touch position, and outputs the display image on the touch panel display 105.

In step S204, the determination unit 113 determines whether the user has input the instruction to transmit the object. According to the present exemplary embodiment, if the user has continued the drag operation until the touch position has reached an edge of the screen, the determination unit 113 determines that the user has input the object transmission instruction.

More specifically, the determination unit 113 determines whether the coordinates indicating the latest touch position obtained in step S201 satisfy a predetermined condition. For example, the determination unit 113 determines whether one of the following formulas is satisfied when the coordinates on the X-axis and the Y-axis of the latest touch position are respectively indicated as X and Y.

If the coordinates do not satisfy any of the following formulas, it is assumed that the user has continued the drag operation until the touch position has reached the edge of the screen. The determination unit 113 thus determines that the user has input the object transmission instruction. In contrast, if the X-coordinate and the Y-coordinate of the latest touch position (X, Y) satisfy the following formulas, the touch position of the user has not reached the edge of the screen. The determination unit 113 thus determines that the user has not input the object transmission instruction. Further, according to the present exemplary embodiment, if the user has released the touch position while the coordinates of the touch position satisfy the following formulas, the determination unit 113 determines that the user has not input the object transmission instruction.

$$0 \leq X \leq Wt \quad \text{(formula 1)}$$

$$0 \leq Y \leq Ht \quad \text{(formula 2)}$$

The determination unit 133 can thus distinguish between whether the user has instructed the transmission operation to be executed, and is performing the drag operation within the transmitting apparatus, based on whether the touch position has reached the edge of the screen. If the determination unit 113 determines that the user has input the object transmission instruction (YES in step S204), the process proceeds to step S205.

If the determination unit 113 determines that the user has not input the object transmission instruction (NO in step S204), the processes from step S201 to step S204 are repeated, and the determination unit 113 stands by. If the determination unit 113 then determines that user has input the object transmission instruction, the processes of step S205 and thereafter are performed, regardless of whether the user is continuing the touch operation or has released the touch position.

In step S205, the direction determination unit 114 obtains from the storing unit 112 the coordinate information of the drag operation being performed by the user. According to the present exemplary embodiment, the direction determination unit 114 obtains the series of coordinate information detected from when the touch position has been detected to when the touch position has reached the edge of the screen.

In step S206, the direction determination unit 114 determines the operation direction, and notifies the management unit 115 of the determined operation direction. The operation direction is the direction instructed by the touch operation input by the user for transmitting the object.

According to the present exemplary embodiment, the user inputs a transmission start instruction by performing the drag operation as follows. The user moves a finger touching the object 122, displayed at the center of the screen, to the edge of the screen 121. The operation direction thus corresponds to the direction on the screen 121 in the transmitting apparatus, from the position at which the touch operation is started towards the position at which the receiving apparatus exists.

The direction determination unit 114 determines as the information indicating the operation direction among the series of coordinate information obtained in step S205, the information indicating the direction from the initial coordinates towards the final coordinates. However, the method for determining the direction is not limited thereto. For example, the direction from the coordinates of a center point on the screen towards the final coordinates in the drag operation may be determined as the operation direction.

According to the present exemplary embodiment, the information indicating the operation direction is expressed as an angle with reference to a Y-axis direction using numerical values from 0 to 359 degrees. If the angle of 360 degrees or greater or 0 degrees or less is obtained, the value is converted to fit within the range.

As a result, an upward direction from the center of the screen 121 along the Y-axis direction becomes 0 degrees, and a downward direction becomes 180 degrees. However, the information indicating the direction is not limited to the value indicating the angle, and information which is less accurate, such as up, down, right, left, upper right, and lower left, may also be used.

In step S207, the management unit 115 determines whether the operation direction of the current transmission operation is the same as the operation direction determined when the user has previously input the transmission instruction. The management unit 115 determines by comparing the operation direction determined when the user has previously input the transmission instruction with the operation direction notified from the direction determination unit 114, stored in the storing unit 112.

If the management unit 115 determines that the operation direction of the current transmission operation is the same as the operation direction determined when the user has previously input the transmission instruction (YES in step S207), the process proceeds to step S208. If the management unit 115 determines that the operation direction of the current transmission operation is not the same as the operation direction determined when the user has previously input the transmission instruction (NO in step S207), the process proceeds to step S210.

If the difference in the values of the angles is within an error range of ±5 degrees as a result of the comparison, the management unit 115 determines that the operation direction of the current transmission operation is the same. Further, if the numerical values indicating the angles of the operation directions are identical, the management unit 115 determines that the operation directions are the same. Furthermore, if an angle of 360 degrees with reference to the center of the screen 121 is divided into 8 segments, and the angles of the operation directions are included in a same segment, the management unit 115 determines that the operation directions are the same.

In step S208, the transmission unit 116 transmits to the receiving apparatus the information indicating that the operation direction is the same direction as that in the previous transmission operation. According to the present exemplary embodiment, the transmission unit 116 transmits predetermined flag information. More specifically, the transmission unit 116 transmits a "true" flag indicating that the operation direction is the same direction as that of the previous transmission operation.

In step S209, the transmission unit 116 transmits to the receiving apparatus the information on the object to be transmitted. According to the present exemplary embodiment, the transmission unit 116 transmits the image information of the object 122 (i.e., the thumbnail image) in priority to other information. Further, according to the present exemplary embodiment, the transmission unit 116 transmits the image data corresponding to the thumbnail image.

On the other hand, in step S210, the direction determination unit 114 stores in the storing unit 112 the information on the operation direction determined in the current process. As a result, the information indicating the operation direction stored in the storing unit 112 is updated. According to the present exemplary embodiment, the information indicating the operation direction stored in the storing unit 112 is initialized when the application is started. However, the timing of initialization is not limited thereto. For example, the information may be continuously stored until the initialization is instructed by a user operation.

In step S211, the transmission unit 116 transmits to the receiving apparatus the information indicating that the operation direction is different from the direction of the previous transmission operation. According to the present exemplary embodiment, the transmission unit 116 transmits the flag information similarly as in step S208. More specifically, the transmission unit 116 transmits a "false" flag indicating that the operation direction is of a different direction from that of the previous transmission operation.

In step S212, the transmission unit 116 transmits to the receiving apparatus the information indicating the operation direction determined in step S206, and the image information of the object 122 (i.e., the thumbnail image). Further, according to the present exemplary embodiment, the transmission unit 116 transmits the image data corresponding to the thumbnail image.

In step S213, the display control unit 119 performs display control so that the object 122 disappears from the screen 121 along the operation direction. According to the present exemplary embodiment, an animation is used in which the object 122 gradually exits to outside of the screen along the determined operation direction. The display control unit 119 thus performs rendering and generates the animation, i.e., the display image in which a portion of the object 122 displayed in the screen gradually decreases, and a remaining portion exits to outside of the screen. The display control unit 119 displays such an animation on the touch panel display 105.

The object transmission process performed by the information processing apparatus 100 functioning as the transmitting apparatus according to the present exemplary embodiment is as described above. As a result, the user of the transmitting apparatus performs an intuitive operation of dragging the object towards the position at which a partner to be transmitted the object (i.e., the receiving apparatus) exists in the real world. The user can thus input a transmission target designation and the transmission start instruction by performing the intuitive operation.

In such a case, the user of the transmitting apparatus drags the object towards the position in which the receiving apparatus exists at the time of transmission, even if orientations and the positional relation of the information processing apparatuses change. As a result, the display contents in the plurality of devices can be caused to be related efficiently without requiring an additional operation for connecting the screens.

Further, in the above-described processes of step S209 and step S212 illustrated in FIG. 2, the transmitting apparatus transmits identification information of the image data stored in the external storage device and the information on the browsing authority instead of the image data itself. The amount of information to be transmitted and received can thus be reduced.

Furthermore, the transmitting apparatus may transmit to the receiving apparatus the information indicating a speed of the drag operation of the user, or the size of the portion of the object 122 which has exited to the outside of the screen. In such a case, an amount of the object 122 displayed in the receiving apparatus is reduced, and synchronization of display states in both apparatuses can be further improved.

Moreover, the determination conditions indicated by the above-described formulas 1 and 2 are just examples. The condition for determining whether the user has instructed execution of the transmission operation or is performing the drag operation within the transmitting apparatus is thus not limited thereto. For example, a condition may be set in which, if the touch position has entered a range of D dots from the edge of the screen, it is determined that the touch position has reached the edge of the screen.

Further, if at least a portion of the object 122 has disappeared from the screen 121 (i.e., exited from the screen 121) by the display position of the object 122 being moved according to the drag operation, the transmitting apparatus may determine that the user has input the transmission instruction. As described above, the determination conditions based on the information other than the coordinates may be employed.

In such a case, a predetermined value may be set to a percentage of an area remaining and being displayed on the screen 121 with respect to the area of the entire object. If the percentage of the area remaining on the screen 121 is less than the predetermined threshold value, the transmitting apparatus determines that the user has input the transmission instruction. Further, a predetermined value may be set to a percentage of an area disappearing from the screen 121 with respect to the area of the entire object. If the percentage of the area disappearing from the screen 121 is greater than the predetermined threshold value, the transmitting apparatus determines that the user has input the transmission instruction.

In either case, the threshold value is set to correspond to the following state. A main portion of the content of the object 122 becomes hidden and thus visibly unrecognizable, and a sufficient area is remaining for the user to touch with the finger and perform the drag operation.

As a result, the transmitting apparatus can start transmission when it is firmly determined that the user operating the transmitting apparatus has performed the operation for dragging the object 122 to the outside of the screen in priority to the content of the object 122 being visibly displayed on the screen.

According to the present exemplary embodiment, the transmitting apparatus transmits, along with the information on the operation direction, the information indicating the portion of the object which has run off the screen. The portion which has run off the screen in the transmitting apparatus can thus be controlled to be displayed on the screen in the receiving apparatus. As a result, if the transmitting apparatus determines that the user has input the transmission instruction based on the area of the portion of the object remaining on the screen (or the area of the portion which has run off the screen), the receiving apparatus can display the object 122 as follows. That is, the receiving apparatus can display the object 122 corresponding to the portion which has run off the screen of the transmitting apparatus when the receiving apparatus has become capable of starting to receive the object.

When the screen in the receiving apparatus starts receiving the object, the user can thus recognize the content of the object. Further, the receiving apparatus can display a portion of a sufficient area of the object 122 for the user to perform the drag operation.

In such a case, if the user pushes back or neglects for a predetermined period the object 122 which has appeared on the receiving apparatus, it may be determined that reception of the object and the electronic data has been rejected. The transmission of the object may then be cancelled.

More specifically, if the user pushes back or neglects the object 122 while the object 122 is sufficiently displayed for the user to recognize the content thereof, it can be assumed that the user has determined that the object 122 is unnecessary. In other words, it may be determined as an intuitive action of such a user.

Further, the transmitting apparatus may determine, based the touch operation of the user, that the transmission instruction has been input, as in the following modification example. If the user has input, after the object 122 has reached the edge of the screen 121, a stronger drag operation to further push out the object 122, the transmitting apparatus starts performing display control so that the object 122 runs off the screen, and determines that the transmission instruction has been input.

In such a case, if the user does not input the drag operation for pushing out the object 122 after an outer edge of the object 122 has reached the edge of the screen 121, the transmitting apparatus continuously displays the object 122 at the same position. As a result, it reduces the risk of the transmitting apparatus unnecessarily transmitting the object 122, even when the object 122 has reached the edge of the screen 121 by mistake due to the drag operation on the screen 121 therein.

Further, a strong drag operation performed by the user to push the object 122 to the outside of the screen indicates the user's desire to transmit the object 122 towards a dragging direction, i.e., a natural movement according to such an objective. As a result, the data can be more securely transmitted and received by the user performing an intuitive movement according to the objective thereof.

Furthermore, the present exemplary embodiment is not limited to the case where the object 122 is moved by the drag operation, and may be modified as follows. If the user inputs an operation for enlarging the object 122 so that a portion of the object 122 disappears to outside the screen 121 and is displayed to have run off the screen 121, the transmitting apparatus may determine that the user has input the transmission instruction.

An example of the enlarge operation is that the user touches the object 122 with two fingers which are closed, and opens the fingers while touching the object 122, i.e., a pinch out operation. As a result, the object 122 of a certain area is displayed on the screen in the transmitting apparatus and also on the screen in the receiving apparatus. The users can thus mutually recognize the content of the object and perform the transmission and reception operations.

In such a case, if the user of the receiving apparatus pushes back or neglects for a predetermined period the object 122 which has appeared as described above, it may be determined that the reception of the object and the electronic data has been rejected. The transmission of the object may then be cancelled.

Further, if the transmitting apparatus determines that the transmission instruction has been input when the object 122 runs off the screen in the transmitting apparatus according to any of the touch operations including the drag operation, it becomes easier for the user to remember the operation for instructing transmission.

Each of the above-described modification examples is singularly effective. Further, the modification examples may also be combined and used. In such a case, the modification examples become applicable to various apparatuses of different screen sizes and processing functions by enabling the user to select a method appropriate for the screen size, or to specify an arbitrary setting.

FIG. 3 is a flowchart illustrating an example of the process for receiving the object performed by the information processing apparatus 100 according to the present exemplary embodiment. As described above, according to the present exemplary embodiment, the plurality of information processing apparatuses which transmits and receives the object executes the same application. The plurality of information processing apparatuses can thus identify and communicate with each other. When the receiving mode is set with respect to the application in the information processing apparatus 100, the process of the flowchart illustrated in FIG. 3 is activated, and the information processing apparatus 100 functions as the receiving apparatus.

In step S301, the receiving unit 117 determines whether the information has been received from the transmitting apparatus. According to the present exemplary embodiment, the receiving unit 117 performs determination in step S301 as follows. The receiving unit 117 determines according to completion of receiving at least the flag information and the image information of the object 122 (i.e., the thumbnail image) initially transmitted by the transmission unit 116. As a result, the receiving apparatus can promptly start rendering the object 122.

If the receiving unit 117 determines that the information has been received from the transmitting apparatus (YES in step S301), the process proceeds to step S302. If the receiving unit 117 determines that the information has not been received from the transmitting apparatus (NO in step S301), the receiving unit 117 stands by until the information has been received. According to the present exemplary embodiment, the receiving apparatus continues to asynchronously receive the image data corresponding to the object 122 at the back, at the same time as performing the display control process in the following steps.

In step S302, the position determination unit 118 determines whether the operation direction is the same as that of the previous transmission operation, based on the information received in step S301. According to the present exemplary embodiment, the position determination unit 118 determines according to the value of the flag information received in step S301.

In other words, if the value of the flag is "true", the position determination unit 118 determines that the operation direction is the same as that of the previous transmission operation (YES in step S302). The process then proceeds to step S306. On the other hand, if the value of the flag is "false", the position determination unit 118 determines that the operation direction is not the same as that of the previous transmission operation (NO in step S302). The process then proceeds to step S303.

In step S303, the receiving unit 117 stores in the storing unit 117 the information indicating the operation direction transmitted from the transmission unit 116 in the transmitting apparatus.

In step S304, the position determination unit 118 estimates the positional relation between the transmitting apparatus and the receiving apparatus based on the information indicating the operation direction. More specifically, the position determination unit 118 estimates the direction in which the transmitting apparatus exists with respect to the screen 121 in the receiving apparatus. The position determination unit 118 then determines the position on the screen 121 where the object 122 is to appear (hereinafter the appearance position), so that the object 122 to be operated on appears from the estimated position.

According to the present exemplary embodiment, the transmitting apparatus and the receiving apparatus are operated by being arranged so that the up, down, left, and right of the displays in each of the screens 121 match. In such a case, if display control is to be performed so that the object 122 continuously moves on the screens in both apparatuses, the following becomes necessary. It becomes necessary for a final position in the moving operation of the object 122 in the transmitting apparatus to be continuous to the appearance position of the object 122 in the receiving apparatus.

According to the present exemplary embodiment, the user of the transmitting apparatus inputs the transmission operation by performing the drag operation on the screen in the transmitting apparatus towards the direction in which the receiving apparatus exists. Such a direction is transmitted to the receiving apparatus as the operation direction. It can thus be estimated that the transmitting apparatus exists in the direction from the center of the screen in the receiving apparatus towards the opposite direction from the operation direction as viewed from the screen in the receiving apparatus.

As a result, the position determination unit 118 generates a vector starting from the center of the screen, and having a direction which is a 180 degrees turn from the operation direction. The position determination unit 118 then determines the position at which the vector intersects the edge of the screen as the appearance position of the object. More specifically, a region surrounding the position at which the vector intersects the edge of the screen is the region which is nearest to the transmitting apparatus in distance among the edges of the screen in the receiving apparatus. The appearance position of the object is thus determined as described above.

According to the present exemplary embodiment, the screens in the transmitting apparatus and the receiving apparatus are arranged so that the up, down, right, and left of the displays in each of the screens 121 match. If the display screen 121 is rectangular, it is likely that the screens are adjacent at sides or vertices thereof which are positioned at opposite angles to each other. For example, if the final position of the drag operation in the transmitting apparatus is the left edge of the screen 121 in the transmitting apparatus, it is likely that the transmitting apparatus is arranged on the right and the receiving apparatus on the left. Further, it is likely that a portion of the left side of the transmitting apparatus and a portion of the right side of the receiving apparatus are adjacent to each other.

In other words, display control can be easily performed so that the movement of the object becomes continuous in the boundaries of the screens in the two apparatuses, by determining the following point as the appearance position. The point which becomes point-symmetric with respect to the coordinates of the center of the screen 121 in the final position at the left end of the screen in the transmitting apparatus, i.e., the point existing on the right edge of the screen 121 in the receiving apparatus, is determined as the appearance position. According to the present exemplary embodiment, the coordinates of the appearance position are determined as described above using the vector having the direction which is 180 degrees turned from the operation direction. As a result, the point which is point-symmetric with respect to the final position can be determined as the appropriate appearance position even if there is a difference in the sizes and the resolutions of the screens in the transmitting apparatus and the receiving apparatus.

In step S305, the position determination unit 118 stores in the storing unit 112 the information on the appearance position determined in step S304.

On the other hand, in step S306, the position determination unit 118 reads among the information stored in the storing unit 112, the information on the appearance position and the operation direction determined when the process of step S304 has been previously performed.

In step S307, the display control unit 119 performs display control so that the object 122 appears from the appearance position in the screen 121 determined by the position determination unit 118. According to the present exemplary embodiment, the display control unit 119 uses and displays the animation in which the object 122 appears from the appearance position along the operation direction determined in the transmitting apparatus. Since the moving direction of the object in the screen in the transmitting apparatus and the moving direction of the same object in the screen in the receiving apparatus can be assumed to be parallel, such an animation can be used.

As a result, the display control unit 119 performs rendering using the received image information. The display control unit 119 thus generates the animation, i.e., the display image in which the position is adjusted so that the object 122 appears with the coordinates of the appearance position at the center. The display control unit 119 then outputs the animation on the touch panel display 105. However, the method for displaying the object to appear from the appearance position is not limited to the above-described method using the animation.

For example, a still image may be generated in which only a portion of the object 122 is displayed and the remaining portion thereof runs off to the outside of the screen 121, and be output on the touch panel display 105.

Further, if the receiving apparatus detects that the user has touched the object 122 which has appeared, the display control unit 119 controls the display position of the object 122 according to the user moving the touch position. Furthermore, the display control unit 119 controls so that, if the user has stopped touching, the display position of the object 122 becomes the center of the screen 121.

Moreover, the display control unit 119 may perform display control as follows. The receiving apparatus receives from the transmitting apparatus the information indicating the drag speed and the size of the area of the portion of the object 122 which has run off the screen when the transmission operation is executed. The display control unit 119 then performs synchronous display control so that the portion which has run off the screen in the transmitting apparatus appears on the screen in the receiving apparatus.

If the user does not touch the object which has appeared on the screen in the receiving apparatus, it may be assumed that the user has rejected receiving the electronic data. The reception of the electronic data may then be cancelled, or the received electronic data and the browsing authority may be deleted.

The flow of the object receiving process executed by the information processing apparatus 100 functioning as the receiving apparatus according to the present exemplary embodiment is as described above. The plurality of information processing apparatuses can perform mutually-related display control by performing the process based on the direction information the receiving apparatus receives from the transmitting apparatus. The display control can be performed even if the plurality of information processing apparatuses does not have means for accurately obtaining the mutual position information. The user of the receiving apparatus can thus intuitively recognize that the object has been received, and the position of the person transmitting the object, by display control performed in cooperation with the transmitting apparatus.

The method for determining the appearance position performed by the receiving apparatus in step S304 illustrated in FIG. 3 is not limited to the method using the vector based on the operation direction. For example, the appearance position may be determined based on the coordinates of the final touch position in the drag operation on the screen in the transmitting apparatus.

In such a case, in step S209 and step S212 illustrated in FIG. 2, the transmitting apparatus transmits to the receiving apparatus the coordinates of the touch position last detected in step S201 as the final position. The receiving unit 117 then stores in the storing unit 112 the transmitted information on the final position along with the information on the operation direction. Further, the position determination unit 118 determines as the coordinates of the appearance position, the point which is point-symmetric with respect to the center point in the screen of the final position stored in the storing unit 112.

If the transmitting apparatus and the receiving apparatus include displays of the same size and the same image resolution as in the present exemplary embodiment, the following can then be performed. That is, the coordinates which are of opposite angles with respect to the coordinates corresponding to an outer periphery of the screen can be previously stored. By previously obtaining the information, the appearance position may be more promptly determined as compared to generating the vector.

The process for determining the operation direction performed in step S206 in the flowchart illustrated in FIG. 2, and the process for determining the appearance position based on the operation direction performed in step S304 in the flowchart illustrated in FIG. 3, will be described in detail below with reference to FIGS. 4A and 4B.

FIG. 4A illustrates an operation example in which the users of two information processing apparatuses 100 arranged side-by-side by aligning the top and the bottom thereof perform object transmission and receiving operations. More specifically, an example in which a transmitting apparatus 401*a* transmitting an object 403 to a receiving apparatus 401*b* will be described below.

The process for determining the operation direction performed in step S206 illustrated in FIG. 2 by the transmitting apparatus 401*a*, will be described below. Referring to FIG. 4A, the receiving apparatus 401*b* currently exists to the left of the transmitting apparatus 401*a* as seen from the transmitting apparatus 401*a*. The user of the transmitting apparatus 401*a* thus inputs the drag operation to move the object 403 to the left side.

Points Pa, Pb, Pc, Pd, and Pe indicate the touch positions detected by the detection unit 111 while the user is dragging the object 403. In other words, the detection unit 111 detects the touch position 5 times, i.e., from initially detecting the touch position at point Pa to reaching the edge of a screen 402*a*.

FIG. 4B illustrates a table which is an example of the information that the detection unit 111 stores in the storing unit 112 in step S201. According to the present exemplary embodiment, time of detection ("Time") and coordinates ("coordinate data of Drag") are associated with each of the touch positions Pa, Pb, Pc, Pd, and Pe, to correspond to FIG. 4A. The series of coordinate information from when the touch operation has been started is thus stored as illustrated in FIG. 4B according to the present exemplary embodiment. In the example illustrated in FIGS. 4A and 4B, the final position is Pe (Xe, Ye).

The transmitting apparatus 401*a* can obtain the operation direction, excluding at least a portion of the stored information, using the following formula.

$$\text{operation direction} = a\tan((Ye-Ya)/(Xe-Xa)) \quad \text{(formula 3)}$$

In the example illustrated in FIG. 4A, the obtained operation direction is to the left, as indicated by an arrow 404. Further, the transmitting apparatus 401*a* transmits to the receiving apparatus 401*b* a value "270" indicating an angle as the information on the operation direction.

It is not necessary to store in the storing unit 112 all of the information detected during the drag operation as illustrated in FIG. 4B. For example, the transmitting apparatus 401*a* can obtain the operation direction using formula 3 by only storing the touch position when the touch operation has been started, and the touch position of the latest detection. By limiting the information on the touch positions to be stored in the storing unit 112 as described above, the necessary storing area can be reduced.

The method for obtaining the operation direction is not limited to the example in which the stored coordinate information and formula 3 are employed, and any method may be used.

For example, the transmitting apparatus 401*a* may determine the operation direction to be one of up, down, right, or left, according to the side among the four surrounding sides of the screen 402*a* to which the final position is closest. In such a case, it becomes unnecessary to calculate the angle, and the present exemplary embodiment may be realized without increasing a load on the transmitting apparatus 401*a*.

Further, the four sides may be divided into arbitrary numbers, and the accuracy of the direction information may be adjusted such as upper left and lower right. Furthermore, the formula to be used is not limited to formula 3. For example, an angle formed by a straight line, identified using dispersion of a plurality of coordinate information stored in the storing unit 112, with respect to a coordinate axis may be obtained.

The process for determining, based on the received information indicating the operation direction, the appearance position of the object 403 to be operated performed in step S304) by the receiving apparatus 401*b*, will be described below.

According to the present exemplary embodiment, the receiving apparatus 401*b* generates, based on the received information indicating the operation direction, the vector starting from the center of a screen 402*b* and directed towards the transmitting apparatus 401. In the example illustrated in FIG. 4A, the vector indicated by an arrow 407 is generated. More specifically, the vector starts from a center 406 of the screen 402*b*, and has a direction which is turned 180 degrees (i.e., 90 degrees in a clockwise direction from the Y-axis) from the operation direction (i.e., turned 270 degrees in the clockwise direction from the Y-axis). The receiving apparatus 401*b* then determines as the appearance position a point 408 at which the arrow 407 intersects the screen 402*b*, and obtains the coordinates.

As a result, the receiving apparatus 401*b* performs display control so that the object 403 appears from the point 408 determined as the appearance position. More specifically, the receiving apparatus 401*b* generates the display image in which insertion starts in the state where the point 408 matches a midpoint of a left short side of the object 403, and outputs the display image on the touch panel display 105.

As described above, according to the present exemplary embodiment, the display states of the object can be related on the screens in the transmitting apparatus and the receiving apparatus by a simple exchange of information. The display states of the object can be related even when there is no means for the plurality of information processing apparatuses to accurately obtain the mutual position information.

According to the present exemplary embodiment, the transmitting apparatus transmits to the receiving apparatus the information based on the operation direction determined according to the drag operation. The receiving apparatus which receives the information uses the operation direction to determine the appearance position at which the object appears on the screen.

By determining the appearance position based on the operation direction as described above, the following can be realized. The point which is point-symmetric to the final position may be determined as the appropriate appearance position even when there is a difference in the sizes and the resolutions of the respective screens in the transmitting apparatus and the receiving apparatus.

However, the information determined by the transmitting apparatus as the information to be used in controlling the display position of the object in the receiving apparatus is not limited to the operation direction.

For example, the transmitting apparatus may determine the appearance position of the object on the screen in the receiving apparatus, and transmit the information indicating the appearance position. Further, the transmitting apparatus may generate the display image to be output on the screen in the receiving apparatus, and transmit the information to be used in rendering the display image.

Furthermore, a plurality of animations which expresses the object entering and exiting the screen when the object is transmitted and received may be previously generated to correspond to a plurality of operation directions. The plurality of such animations may be stored in the storing unit in each unit or an external device. In such a case, the transmitting apparatus displays, by determining the animation to be used based on the drag operation of the user, the object as if disappearing towards outside of the screen.

The transmitting apparatus then transmits as the information to be used in controlling the display position of the object, the information designating the animation to be used in the receiving apparatus. The receiving apparatus thus uses the animation indicated by the received information to display the object to appear in the screen.

Moreover, in the above-described example, the information processing apparatus may be used as both the transmitting apparatus which transmits the operation target and the receiving apparatus which receives the transmitted operation target. However, according to the present exemplary embodiment, a transmission-dedicated apparatus and a reception-dedicated apparatus may also be used.

OPERATION EXAMPLE 1

A series of processes performed according to the present exemplary embodiment will be described below with reference to specific operation examples.

Figure 5A:
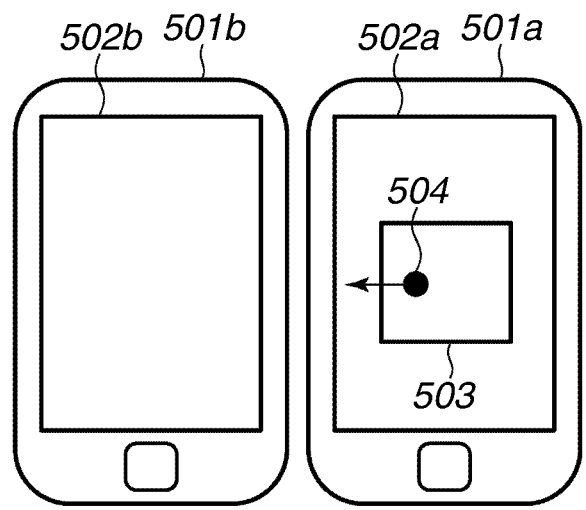
FIGS. 5A, 5B, and 5C illustrate an operation example for transmitting and receiving an object when two information processing apparatuses are arranged immediately next to each other by aligning the top and the bottom thereof.
Figure 5B:
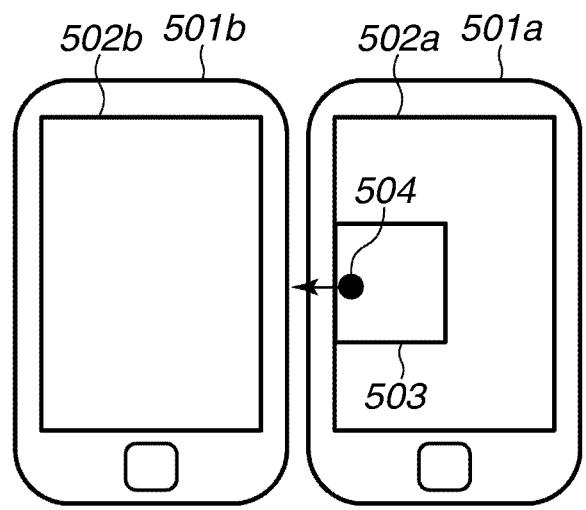
Figure 5C:
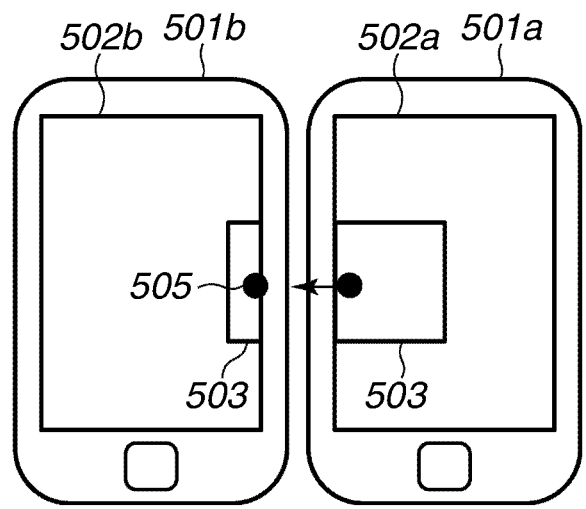

FIGS. 5A, 5B, and 5C illustrate an operation example in which the user performs operations for transmitting and receiving the object according to the present exemplary embodiment. The information processing apparatuses 100 to be operated are arranged side-by-side by aligning the top and the bottom thereof, similarly as illustrated in FIG. 4A.

Referring to FIGS. 5A, 5B, and 5C, a transmitting apparatus 501*a* transmits an object 503 to a receiving apparatus 501*b*. The user of the transmitting apparatus 501*a* performs the drag operation and moves the display position of the object 503. The user thus pushes the object 503 to the outside of a screen 502*a* towards the left side in which the receiving apparatus 501*b* exists. It is assumed that the operation example 1 described with reference to FIGS. 5A, 5B, and 5C is an operation which is performed for the first time, and that the information indicating the previous operation direction is not stored in the storing unit 112 in the transmitting apparatus 501*a*.

FIG. 5A illustrates a state where the user starts the drag operation on the object while the object 503 is displayed at the center of the screen 502*a* in the transmitting apparatus 501*a*.

Referring to FIG. 5A, a touch position 504 is the latest touch position obtained in step S201 in the flowchart illustrated in FIG. 2. Further, the user is performing the drag operation in the direction indicated by the arrow illustrated in FIG. 5A (i.e., YES in step S202). The transmitting apparatus 501*a* thus performs display control to move the display position of the object 503 following the movement of the touch position 504 in step S203.

According to the present exemplary embodiment, the conditions of formula 1 and formula 2 are set so that the touch position 504 can be assumed to have reached the edge of the screen 502*a*. As a result, it is not determined in the state illustrated in FIG. 5A that the user has input the object transmission instruction (i.e., NO in step S204). The transmitting apparatus 501*a* thus determines that the drag operation is closed within the transmitting apparatus 501*a*.

FIG. 5B illustrates that the user has proceeded with the drag operation and the touch position 504 has thus reached the edge of the screen 502*a*. In such a case, if the origin is set at the lower left of the touch panel, the coordinate value in the X-axis direction of the drag input, indicated by a drag point of the touch position 504, becomes 0. The formula 1 is thus not satisfied, and the transmitting apparatus 501*a* determines that the user has input the object transmission instruction (i.e., YES in step S204).

In step S205, the transmitting apparatus 501*a* determines the operation direction. Referring to FIG. 5B, the object 503 is moved in the left direction of the screen by the drag operation, so that the transmitting apparatus 501a determines the information on the angle indicating the operation direction as "270 degrees".

The storing unit 112 does not currently store the information indicating the previous operation direction. The transmitting apparatus 501a thus determines that the determined operation direction is not the same operation direction as the operation direction of the previous transmission operation (i.e., NO in step S207). As a result, the transmitting apparatus 501a stores in the storing unit 112 the information indicating the operation direction in step S210. Further, the transmitting apparatus 501a transmits to the receiving apparatus 501b the "false" flag information indicating that the operation direction is different from the previous operation direction in step S211.

Furthermore, the transmitting apparatus 501a transmits to the receiving apparatus 501b the value "270 degrees" indicating the angle and the image information of the object 503 as the information indicating the operation direction in step S212.

The transmitting apparatus 501a then performs display control in the screen 502a so that the object disappears from the screen 502a along the operation direction, i.e., towards the left in step S213.

FIG. 5C illustrates a state where the receiving apparatus 501b starts to perform display control by receiving the information from the transmitting apparatus 501a in step S301 illustrated in FIG. 3. Referring to FIG. 5C, the receiving apparatus 501b determines that the operation direction is different from the previous operation direction, based on the "false" flag information received from the transmitting apparatus 501a (i.e., NO in step S302).

As a result, the receiving apparatus 501b stores in the storing unit 112 the value "270 degrees" as the information indicating the received operation direction in step S303. The receiving apparatus 501b then generates the vector in which the center of the screen 502b is the start point, and directed at 90 degrees obtained by reversing "270 degrees" by 180 degrees. The receiving apparatus 501b thus determines as the appearance position, a point 505 at which the generated vector intersects the edge of the screen 502b in step S304.

The receiving apparatus 501b displays the object 503 appearing from the appearance position 505 to move along the operation direction in step S307.

According to the present exemplary embodiment, the transmitting apparatus 501a and the receiving apparatus 501b are arranged so that the up, down, right, and left of the displays in the screen 502a and the screen 502b match. By performing the above-described display control, the object 503 is displayed as if continuously moving over the boundaries of the screen 502a and the screen 502b. As a result, the user can intuitively recognize the movement of the object between the apparatuses even when each of the apparatuses does not include means for accurately obtaining the mutual position information.

OPERATION EXAMPLE 2

Figure 6A:
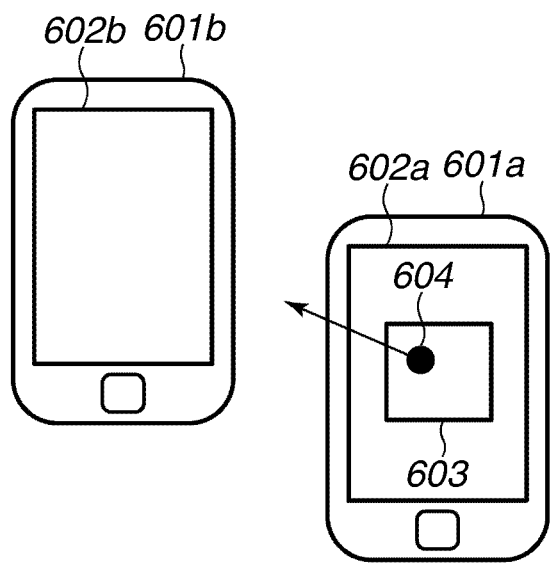
FIGS. 6A, 6B, and 6C illustrate an operation example for transmitting and receiving an object between two information processing apparatuses.
Figure 6B:
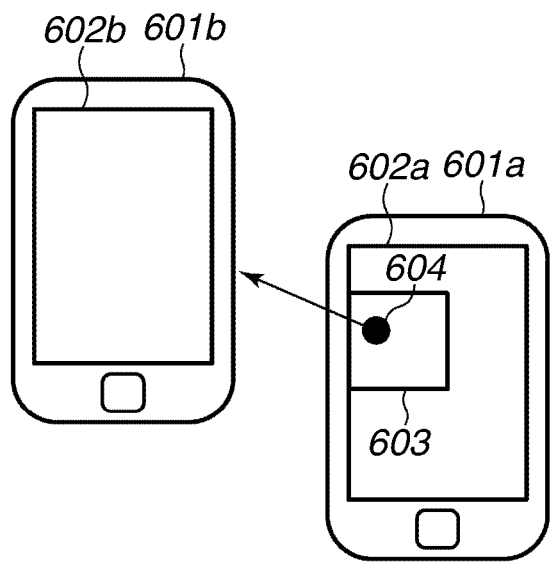
Figure 6C:
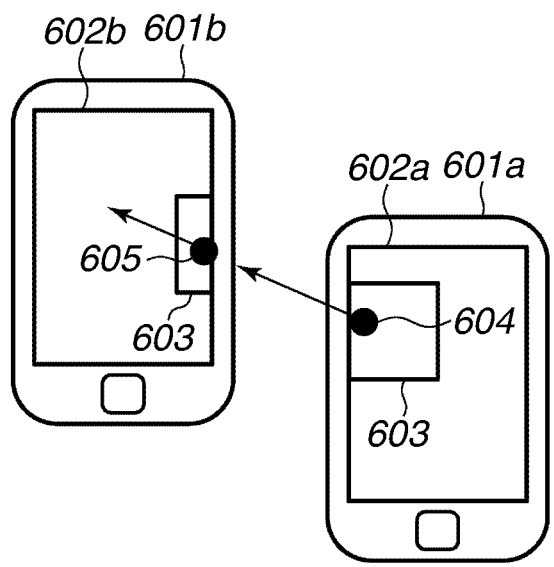

FIGS. 6A, 6B, and 6C illustrate an operation example in which the user performs the operations of transmitting and receiving the object according to the present exemplary embodiment. In the example illustrated in FIGS. 6A, 6B, and 6C, the positions of the information processing apparatuses 100 are displaced in the vertical direction. However, it is assumed that the up, down, right, and left in the displays in the screens of the apparatuses match.

Referring to FIGS. 6A, 6B, and 6C, a transmitting apparatus 601a transmits to a receiving apparatus 601b the image data corresponding to an object 603. The user of the transmitting apparatus 601a performs the drag operation and moves the display position of the object 603. The user thus pushes out the object 603 towards the direction in which the receiving apparatus 601b exists (i.e., to the upper left of a screen 602a). It is assumed in the operation example 2 illustrated in FIGS. 6A, 6B, and 6C that the operation direction in the operation example 1 is stored in the storing unit 112 in the transmitting apparatus 601a.

FIG. 6A illustrates a state where the user starts the drag operation on the object 603 while the object 603 is displayed at the center of the screen 602a in the transmitting apparatus 601a. Referring to FIG. 6A, the transmitting apparatus 601a performs display control to move the display position of the object 603 following the movement of a touch position 604 being moved by the drag operation in the direction of the arrow illustrated in FIG. 6A in step S203.

In the state illustrated in FIG. 6A, the touch position 504 satisfies the conditions indicated by formula 1 and formula 2. The transmitting apparatus 601a thus determines that the user has not input the object transmission instruction (i.e., NO in step S204) and that the drag operation is closed within the transmitting apparatus 601a.

FIG. 6B illustrates a state that the user has proceeded with the drag operation and the touch position 604 has thus reached the edge of the screen 602a. In such a case, the coordinate value in the X-axis direction of the drag input, indicated by the drag point of the touch position 604, becomes 0. The touch position 604 thus does not satisfy formula 1, and the transmitting apparatus 601a determines that the user has input the object transmission instruction (i.e., YES in step S204). In step S205, the transmitting apparatus 601a then determines the operation direction.

Referring to FIG. 6B, it is assumed that the information on the angle indicating the operation direction is determined as 300 degrees. The information indicating the previous operation direction stored in the storing unit 112 is 270 degrees which is different from 300 degrees. The transmitting apparatus 601a thus determines that the determined operation direction is not the same operation direction as the previous transmission operation (i.e., NO in step S207). As a result, the transmitting apparatus 601a stores in the storing unit 112 the information indicating the operation direction in step S210. Further, the transmitting apparatus 601a transmits to the receiving apparatus 601b the "false" flag information indicating that the operation direction is different from the previous operation direction in step S211.

Furthermore, the transmitting apparatus 601a transmits to the receiving apparatus 601b the image information of the object 603, the value "300 degrees", i.e., the angle indicating the operation direction, and the image data corresponding to the object 603 in step S212. The transmitting apparatus 601a then performs display control in the screen 602a so that the object disappears from the screen 602a along the operation direction, i.e., towards the left, to the upper left in step S213.

FIG. 6C illustrates a state where the receiving apparatus 601b starts to perform display control by receiving the information from the transmitting apparatus 601a in step S301 illustrated in FIG. 3.

Referring to FIG. 6C, the receiving apparatus 601b determines that the operation direction is different from the previous operation direction, based on the "false" flag information received from the transmitting apparatus 601a (i.e., NO in step S302). As a result, the receiving apparatus 601b stores in the storing unit 112 the value "300 degrees" as the information indicating the received operation direction in step S303.

The receiving apparatus 601b then generates the vector in which the center of the screen 602b is the start point, and directed at 120 degrees obtained by reversing "300 degrees" by 180 degrees. The receiving apparatus 601b thus determines as the appearance position, a point 605 at which the generated vector intersects the edge of the screen 602b in step S204.

The receiving apparatus 601b displays the object 603 appearing from the appearance position 605 to move along the operation direction in step S307. According to the present exemplary embodiment, the transmitting apparatus 601a and the receiving apparatus 601b are arranged so that the up, down, right, and left of the displays in the screen 602a and the screen 602b match. By the receiving apparatus 601b performing the above-described display control, the object 603 is thus displayed as if continuously moving over the boundaries of the screen 602a and the screen 602b. As a result, the user can intuitively recognize the movement of the object between the apparatuses even when each of the apparatuses does not include the means for accurately obtaining the mutual position information.

OPERATION EXAMPLE 3

Figure 7A:
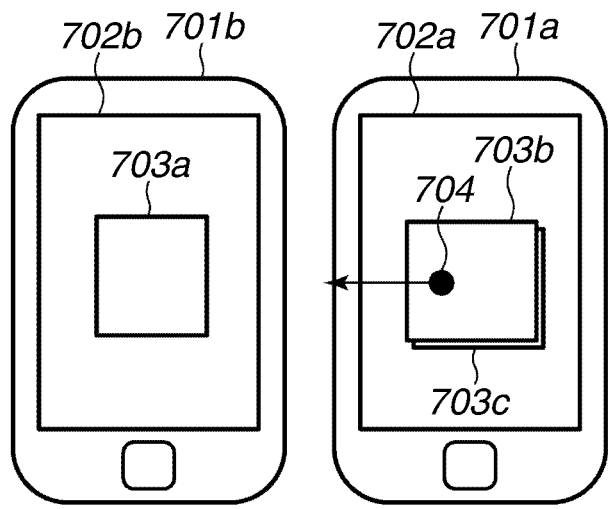
FIGS. 7A, 7B, and 7C illustrate an operation example for transmitting and receiving objects between two information processing apparatuses.
Figure 7B:
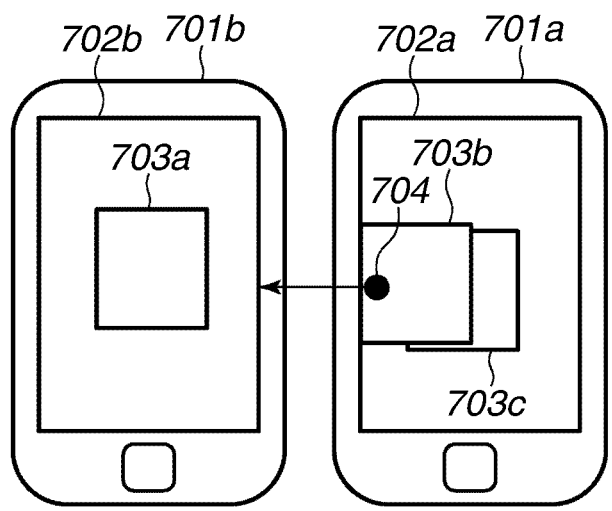
Figure 7C:
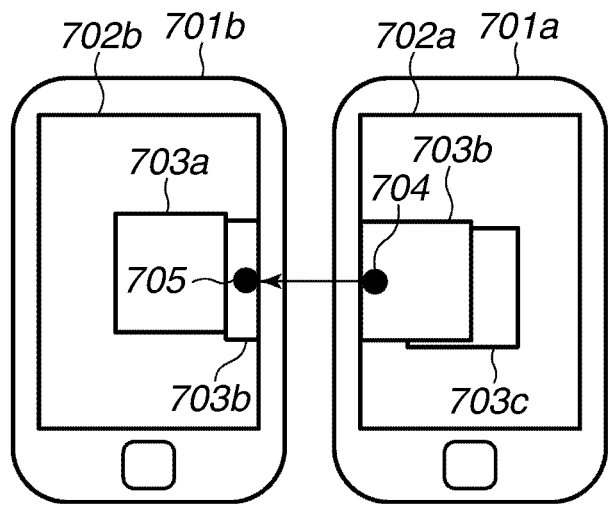

FIGS. 7A, 7B, and 7C illustrate an operation example in which the user performs the operations of transmitting and receiving the objects according to the present exemplary embodiment. The information processing apparatuses 100 to be operated are arranged side-by-side by aligning the top and the bottom, similarly as illustrated in FIG. 4A. Further, the up, down, right, and left of the displays in the screens in the apparatuses similarly match.

FIG. 7A illustrates an object 703a which has been previously transmitted from a transmitting apparatus 701a to a receiving apparatus 701b. Referring to FIG. 7A, a screen 702a in the transmitting apparatus 701a further displays an object 703b and an object 703c. The users transmit and receive the object 703b as will be described below.

According to the present example, it is assumed that the information indicating the operation direction determined when the object 703a has been previously transmitted is 270 degrees. The transmitting apparatus 701a then performs display control to move the display position of the object 703b following the movement of a touch position 704 being moved by the drag operation in the direction of the arrow illustrated in FIG. 7A in step S203.

According to the state illustrated in FIG. 7A, the transmitting apparatus 701a determines that the user has not input the object transmission instruction (NO in step S204), and that the drag operation is closed within the transmitting apparatus 701a.

FIG. 7B illustrates a state where the user has proceeded with the drag operation and the touch position 704 has thus reached the edge of the screen 702a. In such a case, the coordinate value in the X-axis direction of the drag input, indicated by the drag point of the touch position 704, becomes 0. The touch position 704 thus does not satisfy formula 1, and the transmitting apparatus 701a determines that the user has input the object transmission instruction (i.e., YES in step S204).

In step S205, the transmitting apparatus 701a then determines the operation direction. In the example illustrated in FIG. 7B, the transmitting apparatus 701a determines the information on the angle indicating the operation direction similarly as 270 degrees. The transmitting apparatus 701a thus determines that the operation direction, i.e., 270 degrees, is the same as the information indicating the previous operation direction stored in the storing unit 112, i.e., 270 degrees (i.e., YES in step S207). As a result, the transmitting apparatus 701a transmits to the receiving apparatus 701b the "true" flag information indicating that the operation direction is the same as the previous operation direction in step S208.

Further, the transmitting apparatus 701a transmits to the receiving apparatus 701b the image information of the object 703b and the image data corresponding to the object 703b in step S209. Furthermore, the transmitting apparatus 701a performs display control on the screen 702a so that the object 703b disappears from the screen 702a to the upper left along the operation direction, i.e., towards the left in step S213.

FIG. 7C illustrates a state where the receiving apparatus 701b starts to perform display control by receiving the information from the transmitting apparatus 701a in step S301. The receiving apparatus 701b determines that the operation direction is the same as the previous operation direction, based on the "true" flag information received from the transmitting apparatus 701a (i.e., YES in step S302).

As a result, the receiving apparatus 701b reads the information indicating the operation direction and the coordinate information of an appearance position 705 in the previous process, stored in the storing unit 112 in step S306. The receiving apparatus 701b then displays on the screen 702b, the object 703b appearing from the appearance position 705 to move along the operation direction in step S307.

According to the present exemplary embodiment, the transmitting apparatus 701a and the receiving apparatus 701b are arranged so that the up, down, right, and left of the displays in the screen 702a and the screen 702b match. By performing the above-described display control, the object 703b is thus displayed as if continuously moving over the boundaries of the screen 702a and the screen 702b. As a result, the user can intuitively recognize the movement of the object between the apparatuses even when each of the apparatuses does not include the means for accurately obtaining the mutual position information.

As described above, when the transmitting apparatus and the receiving apparatus continuously transmit and receive two or more objects, the receiving apparatus performs determination using the flag information indicating whether the operation direction is the same as in the previous transmission and reception operations. As a result, the amount of information to be transmitted can be reduced, and leads to a decrease in the load of the communication process. Further, the calculation for obtaining the coordinates performed in the receiving apparatus can be omitted, so that the processing load on the information processing apparatus 100 can be reduced.

According to the above-described first exemplary embodiment, the object transmission instruction is input by the drag operation performed on the object displayed at the center of the screen in the transmitting apparatus. In other words, the operation direction is one of the directions which radially spread from a center region of the screen.

As a result, the vector generated for determining the appearance position in the receiving apparatus starts from the center of the screen. Further, display control is performed so that the object to be transmitted and received constantly appears towards the center of the screen.

A modification example of the first exemplary embodiment will be described below. More specifically, an example will be described below in which the receiving apparatus uses, when determining the appearance position, the final position in addition to the operation direction received from the transmitting apparatus. The final position is the latest touch position used for determining whether the user has input the object transmission instruction in the transmitting apparatus.

According to the modification example, the display contents in the apparatuses can thus be related without a feeling of strangeness. Such a result can be achieved even when the object to be operated on is moved to an arbitrary position by the user performing the drag operation closed within the transmitting apparatus before inputting the object transmission instruction.

Figures 8A, 8B:
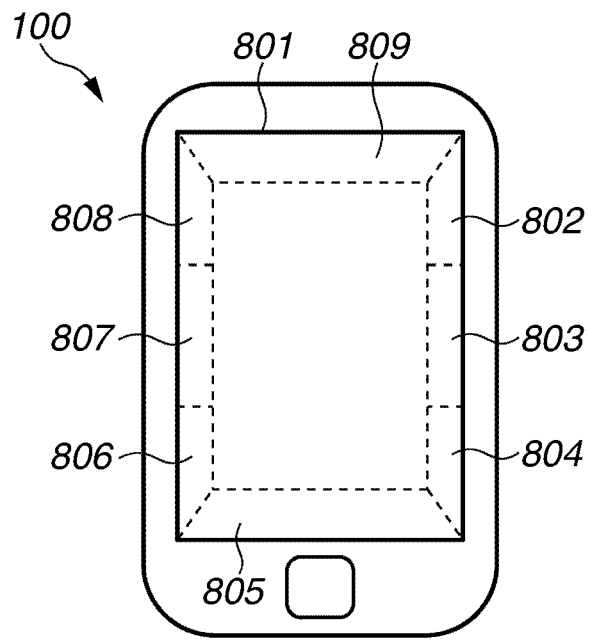
FIGS. 8A and 8B illustrate an example of a display control process performed by a receiving apparatus.

FIGS. 8A and 8B are schematic diagrams illustrating a method for determining the appearance position according to the modification example of the first exemplary embodiment.

More specifically, FIG. 8A illustrates two long sides of a screen 801 in the information processing apparatus 100 divided into three regions. Eight divided regions 802, 803, 804, 805, 806, 808, and 809 are thus set surrounding the screen 801. Further, FIG. 8B is a table indicating a correspondence relation as follows. That is, the table indicates the correspondence between the region in the screen of the transmitting apparatus in which the final position is included, and the region in the screen of the receiving apparatus which is determined to include the appearance position.

According to the modification example of the first exemplary embodiment, the table illustrated in FIG. 8B is stored in the ROM 102. Further, the table illustrated in FIG. 8B indicates the methods for determining an "appearance position 1" and an "appearance position 2".

If the appearance position is to be determined according to the "appearance position 1", the positional relation between the final position near the two long sides and the corresponding appearance position becomes point-symmetric with respect to the center of the screen. This is similar to the first exemplary embodiment. On the other hand, if the appearance position is to be determined according to the "appearance position 2", the positional relation between the final position near the two long sides and the corresponding appearance position becomes line-symmetric with respect to a linear line crossing the center of the screen. The display states for each of the cases will be described below.

According to the modification example of the first exemplary embodiment, the contents of the processes performed by the transmitting apparatus and the receiving apparatus are similar to those of the steps in the flowcharts illustrated in FIGS. 2 and 3. The differences from the first exemplary embodiment will be described below.

According to the modification example of the first exemplary embodiment, the process of step S206 performed in the transmitting apparatus becomes as follows. When the direction determination unit 114 determines the operation direction, the direction determination unit 114 uses, among the coordinate information of the plurality of touch positions stored in the storing unit 112, the coordinate information obtained in the latest predetermined number of detection processes. As a result, the direction determination unit 114 obtains and determines as the operation direction in the transmitting apparatus, the direction of the drag operation performed immediately before the user pushes the object outside the screen.

For example, the direction determination unit 114 determines the operation direction as follows. The direction determination unit 114 calculates a linear line using a least-square method based on five latest touch positions in a movement trajectory of the touch position during the drag operation, stored in the storing unit 112. The direction determination unit 114 then determines as the operation direction, the angle formed between the calculated linear line and the Y-axis. As a result, the direction determination unit 114 determines as the operation direction, the direction in which the object is being moved when the user has input the object transmission instruction, regardless of the display position of the object when the user starts the drag operation.

In step S208 or step S211, the display control unit 119 transmits to the receiving apparatus the flag information indicating whether the operation direction is the same as the previous operation direction, and the information on the final position. The information on the final position may be the coordinate information of the final position, or the identification information indicating that the final position is included in one of the regions 802, 803, 804, 805, 806, 807, 808, and 809.

Further, according to the modification example of the first exemplary embodiment, in step S304 performed in the receiving apparatus, the position determination unit 118 determines the appearance position based on the received information on the final position. More specifically, the position determination unit 118 determines the region among the above-described regions 802, 803, 804, 805, 806, 807, 808, and 809 which includes the final position indicated by the received information. The position determination unit 118 then refers to the table illustrated in FIG. 8B. The position determination unit 118 thus determines with respect to the region including the appearance position, the region associated with the region including the final position based on the table illustrated in FIG. 8B.

The position determination unit 118 then determines the coordinates of the appearance position so that the object to be operated on appears in the screen of the receiving apparatus from the identified region. According to the modification example of the first exemplary embodiment, the position determination unit 118 determines as the appearance position, center coordinates of the side positioned near the outside of the screen among the sides in a longitudinal direction of each region. In step S307, the display control unit 119 performs display control so that the object to be operated on appears from the determined appearance position.

Figure 9A:
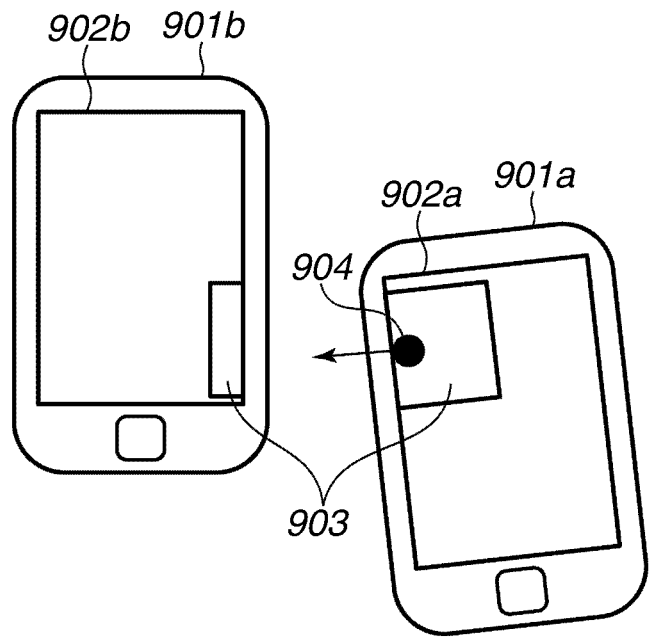
FIGS. 9A and 9B illustrate an example of a display control process performed by a receiving apparatus.
Figure 9B:
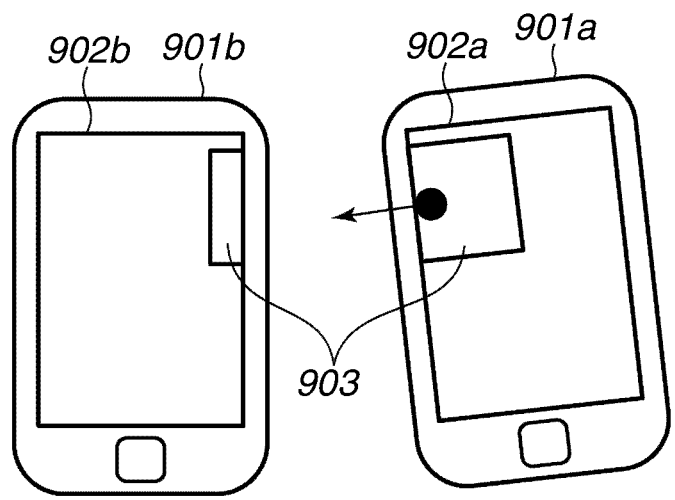

FIGS. 9A and 9B illustrates an operation example in which the users of two information processing apparatuses 100 perform operations for transmitting and receiving the object according to a modification example of the first exemplary embodiment. The example in which a transmitting apparatus 901a transmits an object 903 to a receiving apparatus 901b, will be described below.

FIG. 9A illustrates a case where the appearance position has been determined in the receiving apparatus 901b according to the "appearance position 1" in the table illustrated in FIG. 8B. FIG. 9B illustrates a case where the appearance position has been determined in the receiving apparatus 901b according to the "appearance position 2" in the table illustrated in FIG. 8B.

Referring to FIG. 9A, the final position in the transmitting apparatus 901a is included in the region 808. The appearance position in the receiving apparatus 901b is thus determined within the region 804 according to the "appearance position 1" in the table illustrated in FIG. 8B. If the users of each of the apparatuses use the information processing apparatus by holding the apparatuses in their hands, the screens are often displaced in the vertical direction as illustrated in FIG. 9A.

As a result, if the user of the transmitting apparatus 901a purposely performs the drag operation for moving the object 903 to the position towards the upper left portion of the screen, the receiving apparatus 901b may be arranged to the upper left of the transmitting apparatus 901a. According to the modification example employing the "appearance position 1", the positional relation of the final position near the two long sides and the corresponding appearance position is set to be point-symmetric with respect to the center of the screen. This is similar to the first exemplary embodiment.

On the other hand, referring to FIG. 9B, the final position in the transmitting apparatus 901a is included in the region 808. The appearance position in the receiving apparatus 901b is determined to be included in the region 802 according to the "appearance position 2" in the table illustrated in FIG. 8B.

If the user of the transmitting apparatus 901a then purposely slides the object 903 to the position towards the upper left portion of the screen, the following may be assumed. That is, the object may be previously displayed at a position on the upper side of the screen by the user performing the dragging operation closed within the transmitting apparatus 901a.

In such a case, since the user has input the transmission instruction by dragging the object in the horizontal direction even if there had been no displacement in the vertical direction of the screens in the apparatuses, the final position may be shifted to the upper left. According to the modification example employing the "appearance position 2", the positional relation of the final position near the two long sides and the corresponding appearance position thus becomes line-symmetric with respect to straight line crossing the center of the screen. The display states of each of the cases will be described below.

In either of the above-described cases, the appearance position of the object in the receiving apparatus is determined using the final position of the drag operation input in the transmitting apparatus. The object 903 is thus displayed as if continuously moving over the boundaries of the screen 902a and the screen 902b.

As a result, the user can intuitively recognize the movement of the object between the apparatuses even when each of the apparatuses does not include the means for accurately obtaining the mutual position information. Further, the display contents in the apparatuses can be related without a feeling of strangeness. Such a result can be achieved even when the object to be operated is moved to an arbitrary position by the user performing the drag operation closed within the transmitting apparatus before inputting the object transmission instruction.

Whether to perform the above-described processes according to the "appearance position 1" or the "appearance position 2" in the table illustrated in FIG. 8B can be set according to an operation environment. Further, either the first exemplary embodiment or the modification example of the first exemplary embodiment may be used according to the setting. Furthermore, if the determined operation direction satisfies the predetermined conditions in the first exemplary embodiment, the process may change to the process according to the modification example of the first exemplary embodiment. The first exemplary embodiment or the modification example thereof may thus be used according to the determination within the apparatuses.

According to the first exemplary embodiment, the transmitting apparatus and the receiving apparatus are arranged so that the up, down, right and left of the displays in the respective screens match. As a result, parallel shifting of the displayed object over the two information processing apparatuses is realized by performing display control using the angle information based on the coordinate axes defined on each of the screens.

In contrast, according to a second exemplary embodiment of the present invention, the object is displayed as if continuously moving over the boundaries of the screens, even when the orientations of the two information processing apparatuses are reversed.

Figure 10A:
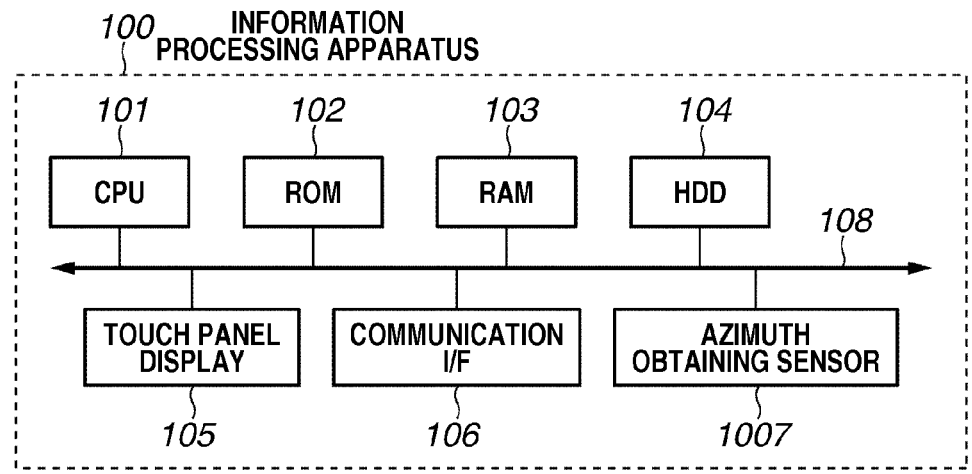
FIGS. 10A and 10B illustrate an example of a functional configuration of the information processing apparatus.
Figure 10B:
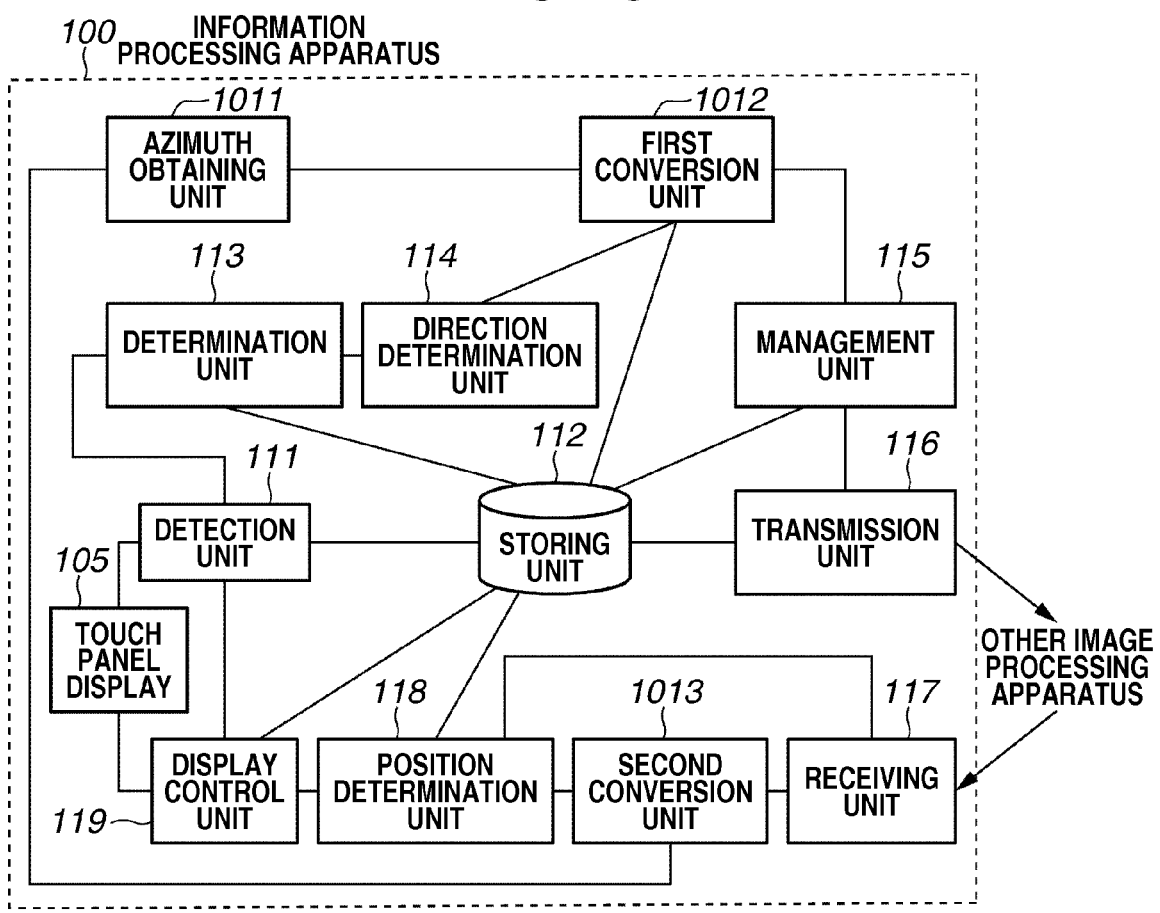

FIGS. 10A and 10B illustrate the configuration of the information processing apparatus 100 according to the present exemplary embodiment. According to the present exemplary embodiment, the information processing apparatus 100 may be the transmitting apparatus which transmits an operation target, or the receiving apparatus which receives a transmitted operation target. The portions which perform processes similar to those according to the first exemplary embodiment are assigned the same reference numerals, and detailed descriptions thereof will be omitted.

FIG. 10A is a block diagram illustrating an example of the hardware configuration of the information processing apparatus 100 according to the present exemplary embodiment. The difference from the first exemplary embodiment is the addition of a compass-direction obtaining sensor 1007.

The compass-direction obtaining sensor 1007 is a device for detecting an inclination (i.e., the orientation) of the information processing apparatus 100 with respect to north. The compass-direction obtaining sensor 1007 uses a global positioning system (GPS) sensor, a geomagnetic sensor, or an acceleration sensor. According to the present exemplary embodiment, the "compass direction" indicates an absolute compass direction indicated as north, south, east, and west. Further, the compass direction is direction information which is an absolute reference independent of the information processing apparatus 100 or the surrounding environment.

FIG. 10B is a block diagram illustrating an example of the functional configuration of the information processing apparatus 100 according to the present exemplary embodiment. The difference from the first exemplary embodiment is the addition of a compass-direction detection unit 1011, a first conversion unit 1012, and a second conversion unit 1013.

The compass-direction detection unit 1011 includes the CPU 101, the ROM 102, the RAM 103, and the compass-direction obtaining sensor 1007. The compass-direction detection unit 1011 obtains the information indicating the direction of the coordinate axes (i.e., the direction of the coordinate axes conforms to the first exemplary embodiment) on the display screen of the information processing apparatus 100 with respect to the compass direction. According to the second exemplary embodiment, the direction determination unit 114 similarly determines the operation direction as the information on the angle based on the coordinate axes defined with respect to the screen of the information processing apparatus 100.

The first conversion unit 1012 includes the CPU 101, the ROM 102, and the RAM 103. The first conversion unit 1012 uses the relation with the direction obtained by the compass-direction detection unit 1011 to convert the angle information defined on the screen to the angle information with respect to the compass direction. The first conversion unit 1012 then notifies the management unit 115 of and stores in the storing unit 112 the converted angle information with respect to the compass direction as the information indicating the operation direction.

Upon receiving the notification, the management unit 115 determines the information to be transmitted from the transmission unit 116, based on the result of comparing the information indicating the previously determined operation direction and the information indicating the currently determined operation direction, similarly as in the first exemplary embodiment.

The second conversion unit 1013 converts the angle information with respect to the compass direction indicating the operation direction among the information received by the receiving unit 117, to the angle information defined on the screen. The second conversion unit 1013 then stores the converted angle information in the storing unit 112, and notifies the position determination unit 118 of the converted angle information.

The position determination unit 118 uses the information indicating the operation direction to determine the appearance position, similarly as in the first exemplary embodiment. Further, the display control unit 119 performs display control so that the object appears from the determined appearance position along the operation direction converted to the angle information defined on the screen.

The processes performed by the transmitting apparatus and the receiving apparatus according to the present exemplary embodiment will be described in detail below with reference to the flowcharts illustrated in FIGS. 11 and 12. The same processes are performed in the steps which are assigned the same numbers as those in the flowcharts illustrated in FIGS. 2 and 3. A detailed description on such steps will thus be omitted, and differences from the first exemplary embodiment will be described below.

Figure 11:
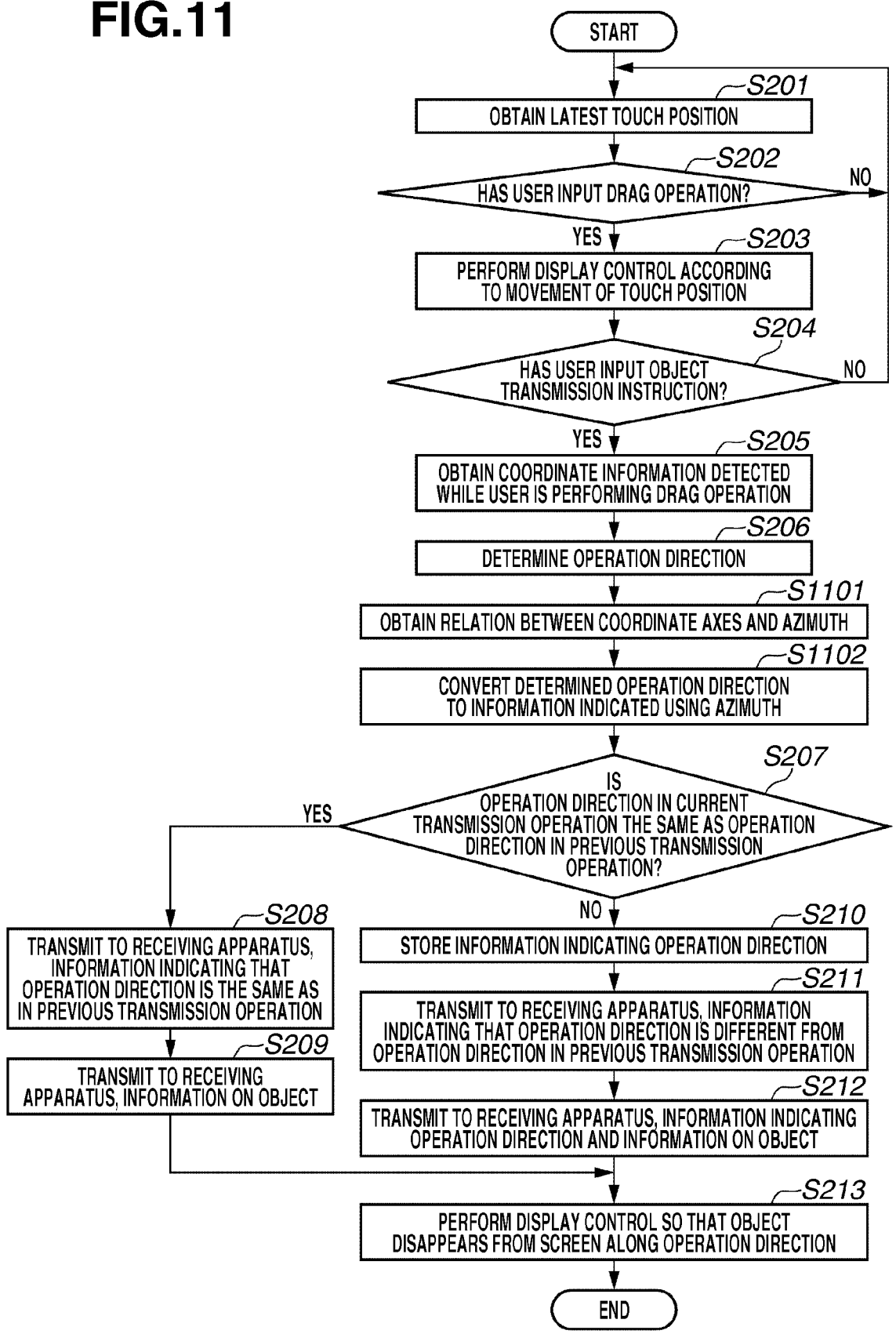
FIG. 11 is a flowchart illustrating an example of a process for transmitting an object performed by an information processing apparatus.

FIG. 11 is a flowchart illustrating an example of the process for transmitting the object performed in the information processing apparatus 100 according to the present exemplary embodiment. The information processing apparatus 100 executes the process of the flowchart illustrated in FIG. 11 in the following state. That is, the information processing apparatus 100 performs the process when at least one object is being displayed at the center of the screen in the information processing apparatus 100 set to the transmission mode, and the input I/F 105 notifies that the user has touched the object.

According to the second exemplary embodiment, after the direction determination unit 114 determines the operation direction in step S206, the process proceeds to step S1101. According to the present exemplary embodiment, in step S206, the direction determination unit 114 determines as the information indicating the operation direction, the value of the angle of the direction of the user drag operation with respect to the Y-axis, based on the coordinate axes defined on the screen in the transmitting apparatus.

In step S1101, the compass-direction detection unit 1011 obtains the relation between the coordinate axes defined on the screen in the transmitting apparatus and the compass direction. According to the second exemplary embodiment, the X-axis and the Y-axis are defined on the screen similarly as illustrated in FIG. 1C, and a depth direction (i.e., Z-axis direction) with respect to the screen is not considered. According to the second exemplary embodiment, the compass-direction detection unit 1011 obtains in step S1101 a value indicating the angle formed by the Y-axis with respect to true north.

According to the second exemplary embodiment, the value indicating the angle is determined with reference to the true north direction, and is a numerical value between 0 degrees to 359 degrees. If the obtained angle is 360 degrees or greater or 0 degrees or less, the value is converted to fit in the range. As a result, the direction towards true south becomes 180 degrees, and the direction towards true west becomes 270 degrees. However, the information indicating the direction is not limited to the value indicating the angle, and less accurate information such as north, south, east, and west may also be used.

In step S1102, the first conversion unit 1012 converts the operation direction determined in step S206 to the information indicated by the compass direction, using the relation between the coordinate axis and the compass direction obtained in step S1101. According to the second exemplary embodiment, the first conversion unit 1012 converts the operation direction defined by the angle with respect to the Y-axis to the information indicating the angle with respect to the true north. The first conversion unit 1012 converts the operation direction using the information on the angle formed by the Y-axis with respect to the true north direction.

The processes performed in step S207 and thereafter are similar to those according to the first exemplary embodiment. However, the information on the operation direction used in each process is the information on the operation direction indicated by the information on the angle with respect to true north converted by the first conversion unit 1012 in step S1102.

The object transmission process performed by the information processing apparatus 100 functioning as the transmitting apparatus according to the second exemplary embodiment is as described above. According to the present exemplary embodiment, the user of the transmitting apparatus can perform an intuitive operation of dragging the object towards the position of the partner to which the object is to be transmitted (i.e., the receiving apparatus) exists. The user can thus input the transmission target designation and the transmission start instruction. This is similar to the first exemplary embodiment.

FIG. 12 is a flowchart illustrating an example of the process for receiving the object performed by the information processing apparatus 100 according to the second exemplary embodiment. According to the present exemplary embodiment, the plurality of information processing apparatuses which transmits and receives the object executes the same application. The plurality of information processing apparatuses is thus capable of identifying and communicating with each other, similarly as in the first exemplary embodiment. When the receiving mode is set with respect to the application in the information processing apparatus 100, the process of the flowchart illustrated in FIG. 12 is activated, and the information processing apparatus 100 functions as the receiving apparatus.

According to the second exemplary embodiment, if the position determination unit 118 determines, based on the flag information received from the transmitting apparatus, that the operation direction is not the same as that in the previous transmission operation in step S302 (i.e., NO in step S302), the process proceeds to step S1201.

In step S1201, the compass-direction detection unit 1011 obtains the relation between the coordinate axes defined on the screen in the transmitting apparatus and the compass direction. According to the present exemplary embodiment, the compass-direction detection unit 1011 obtains in step S1201 a value indicating the angle formed by the Y-axis, defined on the display screen of the receiving apparatus, with respect to true north.

In step S1202, the second conversion unit 1013 converts the operation direction indicated by the compass direction which is received by the receiving unit 117 to the information indicated by the information on the angle defined on the screen in the receiving apparatus, using the relation between the coordinate axes and the compass direction obtained in step S1201. According to the present exemplary embodiment, the second conversion unit 1013 converts the information indicating the angle with respect to the true north to the information indicating the operation direction defined by the angle with respect to the Y-axis, using the information on the angle formed by the Y-axis with respect to the true north direction.

The processes performed in step S303 and thereafter are similar to those according to the first exemplary embodiment. However, the information on the operation direction used in each process is the information indicated by the angle based on the coordinate axes defined on the screen in the receiving apparatus.

The flow of the object receiving process executed by the information processing apparatus 100 functioning as the receiving apparatus according to the present exemplary embodiment is as described above. As a result, the information processing apparatuses can perform mutually-related display control by the receiving apparatus performing the process based on the operation direction received from the transmitting apparatus. This is similar to the first exemplary embodiment.

The user of the receiving apparatus can thus intuitively recognize that the object has been received and the position of the partner transmitting the object by display control performed in cooperation with the transmitting apparatus. According to the present exemplary embodiment, the direction information transmitted from the transmitting apparatus to the receiving apparatus is indicated using the compass direction. However, it is not limited thereto, and the present exemplary embodiment may be realized by using an external reference which is independent of the inclination (i.e., the orientation) of each apparatus.

As described above, according to the second exemplary embodiment, the information on the direction using a reference which is independent of the state of the apparatus, such as the compass direction, is transmitted and received. As a result, display control can be performed in which the plurality of information processing apparatuses is related without being affected by the inclination (i.e., the orientation) of each of the information processing apparatuses. For example, the information which designates, using the compass direction, the appearance position on the screen in the receiving apparatus can be transmitted.

OPERATION EXAMPLE 4

The series of processes performed according to the present exemplary embodiment will be described below using specific operation examples.

Figure 13A:
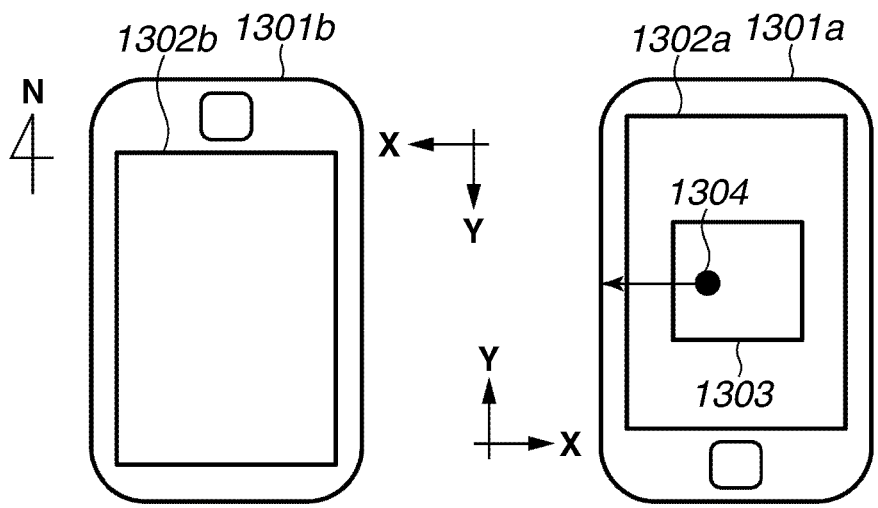
FIGS. 13A, 13B, and 13C illustrate an example of two information processing apparatus arranged at a relative angle of 180 degrees.
Figure 13B:
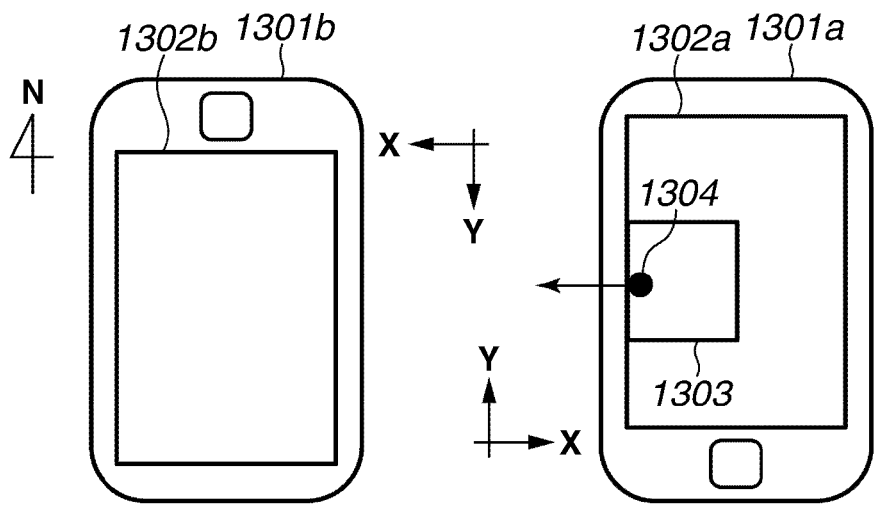
Figure 13C:
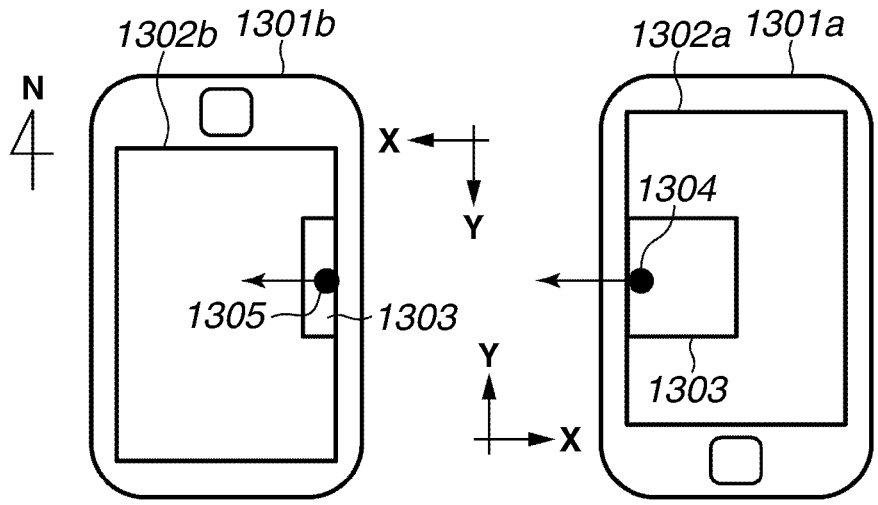

FIGS. 13A, 13B, and 13C illustrate an operation example of the operation for transmitting and receiving an object according to the present exemplary embodiment. The two information processing apparatuses 100 are arranged by reversing the longitudinal direction of the display screen in one of the apparatuses. According to the present operation example, a transmitting apparatus 1301a transmits an object 1303 to a receiving apparatus 1301b.

The user of the transmitting apparatus 1301a performs the drag operation and moves the display position of the object 1303. The user thus pushes the object 1303 to the outside of a screen 1302a towards the left side in which the receiving apparatus 1301b exists. As illustrated in FIGS. 13A, 13B, and 13C, the X-axis and the Y-axis are defined in the screen in each apparatus with the origin at the lower left of the screen. Further, in the example illustrated in FIGS. 13A, 13B, and 13C, the Y-axis of the transmitting apparatus 1301a is directed towards true north.

It is assumed that the operation example 4 described with reference to FIGS. 13A, 13B, and 13C is an operation which is performed for the first time, and the information indicating the previous operation direction is not stored in the storing unit 112 in the transmitting apparatus 1301a.

FIG. 13A illustrates a state where the user starts the drag operation on the object 1303 while the object 1303 is being displayed at the center of the screen 1302a in the transmitting apparatus 1301a. Referring to FIG. 13A, a touch position 1304 is the latest touch position obtained in step S201, and the user is performing the drag operation in the direction indicated by the arrow illustrated in FIG. 13A (i.e., YES in step S202). The transmitting apparatus 1301a thus performs display control to move the display position of the object 1303 following the movement of the touch position 1304 in step S203.

According to the present exemplary embodiment, the transmitting apparatus 1301a determines in the state illustrated in FIG. 13A that the user has not input the object transmission instruction (i.e., NO in step S204). The transmitting apparatus 1301a thus determines that the drag operation is closed within the transmitting apparatus 1301a.

FIG. 13B illustrates a state where the user has proceeded with the drag operation and the touch position 1304 has reached the edge of the screen 1302a. In such a case, if the origin is set at the lower left of the touch panel, the coordinate value in the X-axis direction of the drag input, indicated by the drag point of the touch position 1304, becomes 0. The formula 1 is thus not satisfied, and the transmitting apparatus 1301a determines that the object transmission instruction has been input (i.e., YES in step S204).

In step S205, the transmitting apparatus 1301a then determines the operation direction. Referring to FIG. 13B, the object 1303 is moved in the left direction of the screen by the drag operation, so that the information on the angle indicating the operation direction is determined as 270 degrees. The compass-direction detection unit 1011 then obtains a value indicating the angle formed by the Y-axis in the transmitting apparatus 1301a with respect to the true north direction, in step S1101.

Referring to FIG. 13B, the Y-axis defined in the transmitting apparatus 1301a is parallel with the true north direction. The compass-direction detection unit 1011 thus obtains the value as "0 degrees". The first conversion unit 1012 then converts the operation direction to the information indicated by the compass direction with reference to the true north direction, in step S1102. Since the Y-axis is parallel to the true north direction in the example illustrated in FIG. 13B, the information indicating the operation direction is output as "270 degrees" with respect to the true north direction, in step S1102.

The storing unit 112 does not currently store the information indicating the current operation direction. The transmitting apparatus 1301a thus determines that the determined operation direction is not the same operation direction as the operation direction of the previous transmission operation (i.e., NO in step S207). As a result, the transmitting apparatus 1301a stores in the storing unit 112 the information indicating the operation direction in step S210. Further, the transmitting apparatus 1301a transmits to the receiving apparatus the "false" flag information indicating that the operation direction is different from the previous operation direction, in step S211.

Furthermore, the transmitting apparatus 1301a transmits to the receiving apparatus 1301b the image information of the object 1303, the value "270 degrees" indicating the operation direction, and the image data corresponding to the object 1303, in step S212. The transmitting apparatus 1301a then performs display control in the screen 1302a so that the object disappears from the screen 1302a along the operation direction, i.e., towards the left, in step S213.

FIG. 13C illustrates a state where the receiving apparatus 1301b starts to perform display control by receiving the information from the transmitting apparatus 1301a in step S301 illustrated in FIG. 3.

Referring to FIG. 13C, the receiving apparatus 1301b determines that the operation direction is different from the previous operation direction, based on the "false" flag information received from the transmitting apparatus 1301a (i.e., NO in step S302). The compass-direction detection unit 1011 then obtains the value indicating the angle formed by the Y-axis, defined in the transmitting apparatus 1301a, with respect to the true north direction.

In the example illustrated in FIG. 13C, the Y-axis in the receiving apparatus is facing the true south direction, so that the compass-direction detection unit 1011 obtains the value of 180 degrees in step S1201. The second conversion unit 1013 then converts the operation direction, i.e., "270 degrees", which is received from the transmitting apparatus, to the angle information defined with respect to the screen in the receiving apparatus in step S1202.

More specifically, the Y-axis in the receiving apparatus is turned 180 degrees with respect to the true north direction, so that the operation direction is converted to 90 degrees. This is obtained by subtracting 180 degrees from "270 degrees".

As a result, the position determination unit 118 stores in the storing unit 112 the value "90 degrees" as the information indicating the operation direction in step S303. The receiving apparatus 1301b then generates the vector in which the center of the screen 1302b is the start point, and directed at 90 degrees obtained by reversing "270 degrees" by 180 degrees. The receiving apparatus 1301b thus determines as the appearance position, a point 1305 at which the generated vector intersects the edge of the screen 1302b in step S204.

The receiving apparatus 1301b displays the object 1303 appearing from the appearance position 1305 to move along the operation direction in step S307. By performing the above-described display control, the object 1303 is thus displayed as if continuously moving over the boundaries of the screen 1302a and the screen 1302b. As a result, the user can intuitively recognize the movement of the object between the apparatuses without being affected by the inclination (i.e., the orientation) of each of the information processing apparatuses.

OPERATION EXAMPLE 5

Figure 14A:
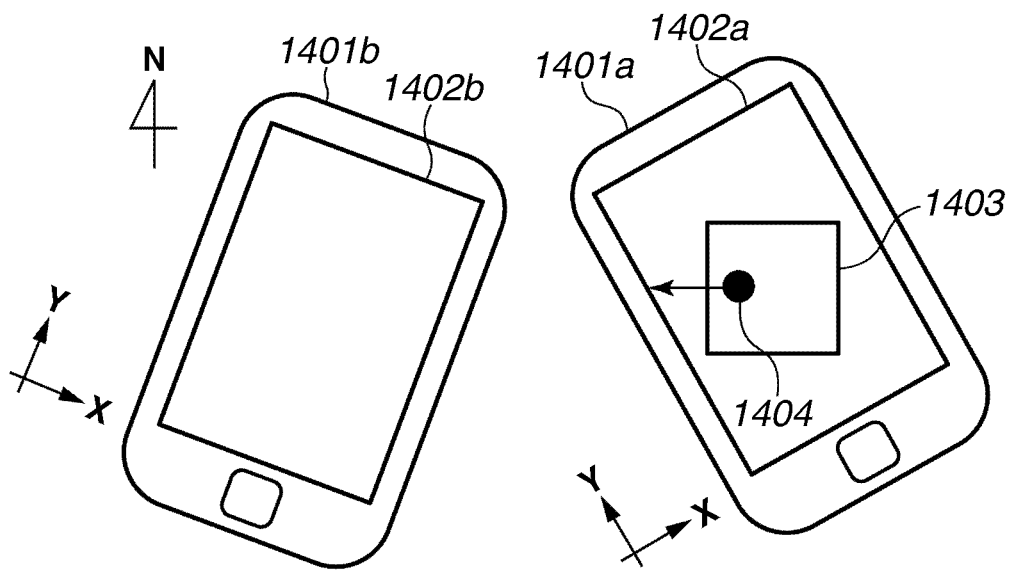
FIGS. 14A and 14B illustrate an example of two information processing apparatus arranged at an arbitrary relative angle.
Figure 14B:
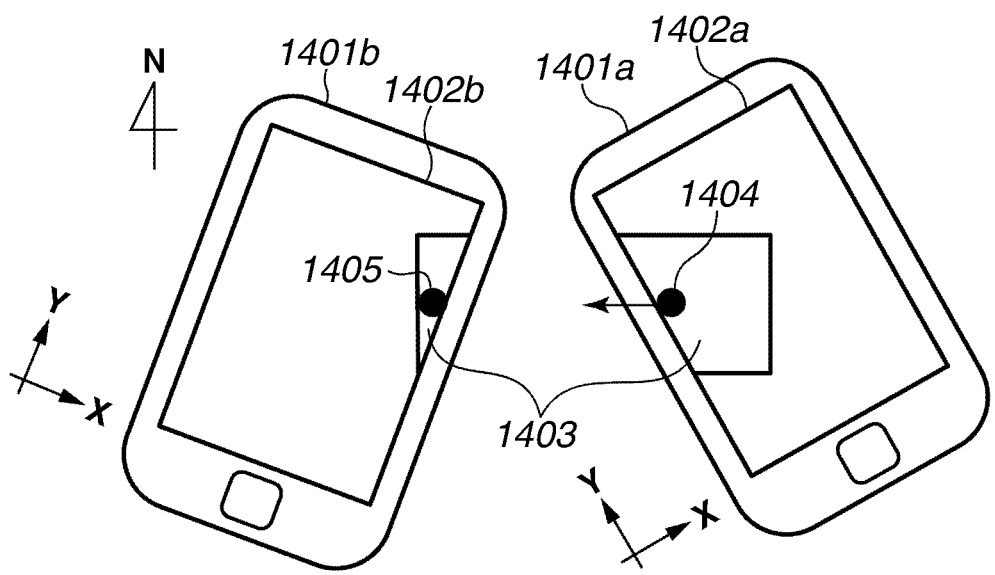

FIGS. 14A and 14B illustrate an operation example in which a transmitting apparatus 1401a and a receiving apparatus 1401b, horizontally-arranged at an arbitrary relative angle, transmit and receive the object according to the present exemplary embodiment.

Referring to FIGS. 14A and 14B, the X-axis and the Y-axis are defined in the screen in each apparatus with the origin at the lower left of the screen. Further, an upward direction with respect to the drawing is defined as the true north direction. The transmitting apparatus 1401a is arranged at an angle of 30 degrees in the anti-clockwise direction with respect to the true north direction. The receiving apparatus 1401b is arranged at an angle of 25 degrees in the clockwise direction with respect to the true north direction. The description on the steps in which the processes are in common with those in the operation example 4 described with reference to FIGS. 13A, 13B, and 13C will be omitted.

FIG. 14A illustrates a state where the user starts the drag operation on an object 1403 while the object 1403 is displayed at the center of a screen 1402a in the transmitting apparatus 1401a. Referring to FIG. 14A, a touch position 1404 is the latest touch position obtained in step S201, and the user is performing the drag operation in the direction indicated by the arrow illustrated in FIG. 14A (i.e., YES in step S202 illustrated in FIG. 11).

FIG. 14B illustrates a state where the user has proceeded with the drag operation and the touch position 1404 has thus reached the edge of the screen 1402a. In step S205, the operation direction unit 114 then determines the operation direction. Referring to FIG. 14B, it is assumed that the information on the angle indicating the operation direction is determined as "300 degrees".

The compass-direction detection unit 1011 then obtains a value indicating the angle formed by the Y-axis defined in the transmitting apparatus 1401a with respect to the true north direction in step S1101. In the example illustrated in FIGS. 14A and 14B, the Y-axis defined in the transmitting apparatus 1401a is inclined by 30 degrees in the anti-clockwise direction with respect to the true north direction. The compass-direction detection unit 1011 thus obtains the value "330 degrees". The first conversion unit 1012 then converts the operation direction indicated as the angle "300 degrees" to the angle information "270 degrees" with reference to the compass direction in step S1102.

More specifically, the first conversion unit 1012 adds the angles "300 degrees" and "330 degrees", and subtracts 360 degrees from the calculated sum so that the angle information becomes 360 degrees or less (i.e., 300+330−360=270). The transmitting apparatus 1401a thus transmits to the receiving apparatus 1401b the image information of the object 1403, the value "270 degrees" based on the compass direction indicating the operation direction, and the image data corresponding to the object 1403 in step S212.

FIG. 14B illustrates a state where the receiving apparatus 1401b starts to perform display control by receiving the information from the transmitting apparatus 1401a in step S301. Referring to FIG. 14B, the receiving apparatus 1401b determines that the operation direction is different from the previous operation direction, based on the "false" flag information received from the transmitting apparatus 1401a (i.e., NO in step S302). The compass-direction detection unit 1011 then obtains the value "25 degrees" indicating the angle formed by the Y-axis defined in the transmitting apparatus 1401a with respect to the true north direction in step S1201.

The second conversion unit 1013 then converts the information on the operation direction, i.e., "270 degrees", which is received by from the transmitting apparatus, to the angle information defined with respect to the screen in the receiving apparatus in step S1202. In the example illustrated in FIG. 14B, the Y-axis defined in the receiving apparatus is turned 25 degrees with respect to the true north direction. The second conversion unit 1013 thus converts the operation direction to "245 degrees".

More specifically, the angle information is calculated by subtracting 25 degrees from "270 degrees". The position determination unit 118 then generates the vector having a direction of 65 degrees, obtained by reversing "245 degrees" by 180 degrees. The position determination unit 118 thus determines as the appearance position a point 1405 at which the generated vector intersects the edge of the screen 1402b in step S204.

The receiving apparatus 1401b displays the object 1403 appearing from the appearance position 1405 to move along the operation direction in step S307. By performing the above-described display control, the object 1403 is thus displayed as if continuously moving over the boundaries of the screen 1402a and the screen 1402b. As a result, the user can intuitively recognize the movement of the object between the apparatuses without being affected by the inclination (i.e., the orientation) of each of the information processing apparatuses.

As describe above, according to the present exemplary embodiment, the display contents in a plurality of information processing apparatuses arranged at an arbitrary relative angle can be related.

<Other Exemplary Embodiments>

The present invention may also be realized by providing software (program) for implementing the functions of the above-described exemplary embodiments to a system or an apparatus via a network or various storage media, and a computer (or a CPU or a micro-processing unit (MPU)) in the system or the apparatus reading and executing the program.

According to the present invention, a technique for causing the display contents in a plurality of information processing apparatuses which transmits and receives objects to be related by the apparatuses performing a simple exchange of information.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-257555 filed Nov. 26, 2012, and Japanese Patent Application No. 2013-236737, filed Nov. 15, 2013, which is hereby incorporated by reference herein in its entirety.

What is claimed is:

1. An information processing apparatus configured to receive information indicating a first compass direction in which an object displayed on a screen has been moved, from another apparatus that transmits the information, the information processing apparatus comprising:
   a receiving unit configured to receive the information indicating the first compass direction in which the object has been moved;
   a detection unit configured to detect geomagnetism;
   an obtaining unit configured to obtain information indicating a second compass direction to which a screen of the information processing apparatus has been directed, the first and second compass directions being absolute directions identified based on the information on geomagnetism; and
   a display control unit configured to cause, based on the information indicating the first compass direction received by the receiving unit and the information, obtained by the obtaining unit, indicating the second compass direction to which the screen of the information processing apparatus has been directed, an object which is the same as an object displayed on a screen of the other apparatus to appear from a compass direction opposite of the first compass direction in which the object displayed on the screen of the other apparatus has been moved, in the screen of the information processing apparatus.

2. The information processing apparatus according to claim 1, further comprising a conversion unit configured to convert, based on the information indicating the second compass direction to which the screen of the information processing apparatus has been directed obtained by the obtaining unit, the information indicating the first compass direction received by the receiving unit to information on an angle defined on the screen,
   wherein the display control unit causes the object, which is the same as the object displayed on the screen of the other apparatus, to appear according to the information on the angle converted to by the conversion unit.

3. The information processing apparatus according to claim 1, wherein the display control unit determines, based on the information indicating the first compass direction received by the receiving unit and a center position of the screen of the information processing apparatus, a position at which the object which is the same as the object displayed on the screen of the other apparatus is caused to appear.

4. The information processing apparatus according to claim 1, wherein the display control unit determines a position corresponding to an opposite position at which the object displayed in the screen of the other apparatus has disappeared as a position where the object appears in the screen of the information processing apparatus.

5. The information processing apparatus according to claim 1, further comprising a storing unit configured to store information indicating a direction in which the display control unit has caused the object to appear,
   wherein the display control unit causes, in a case where the information indicating the first compass direction received by the receiving unit is information indicating that a compass direction to which the object displayed on the screen of the other apparatus has been moved is the same as in a previous operation, the object to appear on the screen of the information processing apparatus from the compass direction indicated by the information stored in the storing unit.

6. The information processing apparatus according to claim 1,
   wherein the display control unit causes a thumbnail image corresponding to image data to appear on the screen of the information processing apparatus as the object; and
   wherein the receiving unit further receives image data corresponding to the thumbnail image which has been caused by the display control unit to appear on the screen of the information processing apparatus.

7. The information processing apparatus according to claim 1, wherein the receiving unit does not receive, in a case where there is no user input with respect to the object, or a user push back the object which has appeared on the screen of the information processing apparatus, the image data.

8. An information processing apparatus configured to transmit information indicating a first compass direction in which an object displayed on a screen has been moved, to another apparatus that receives the information, the information processing apparatus comprising:
- a position detection unit configured to detect a designation position designated on a screen of the information processing apparatus;
- a determination unit configured to determine, based on a change in a designation position detected by the position detection unit, an operation direction in which the object displayed on the screen of the information processing apparatus is moved;
- a geomagnetism detection unit configured to detect geomagnetism;
  - an obtaining unit configured to obtain information indicating a second compass direction to which the screen of the information processing apparatus has been directed, the first and second compass directions being absolute directions identified based on information on geomagnetism;
- a transmission unit configured to identify, based on the operation direction determined by the determination unit and the information indicating the second compass direction to which the screen of the information processing apparatus has been directed obtained by the obtaining unit, information indicating the first compass direction in which the object displayed on the screen of the information processing apparatus has been moved, and transmit the identified information to the other apparatus; and
- a display control unit configured to display on the screen of the information processing apparatus the object moving to disappear towards outside the screen along the operation direction determined by the determination unit.

9. The information processing apparatus according to claim 8, wherein the transmission unit transmits, in a case where a predetermined condition is satisfied by a change in a designation position detected by the position detection unit, the information indicating the first compass direction to which the object has been moved.

10. The information processing apparatus according to claim 8,
wherein the display control unit displays on the screen of the information processing apparatus a thumbnail image corresponding to image data as the object moving to disappear towards outside the screen along the operation direction determined by the determination unit, and
wherein the transmission unit transmits image data corresponding to the thumbnail image displayed on the screen of the information processing apparatus.

11. The information processing apparatus according to claim 8,
wherein the position detection unit detects a designated position at which the screen has been touched, and
wherein the display control unit moves the object displayed on the screen according to a drag operation based on a change in a designation position detected by the position detection unit.

12. The information processing apparatus according to claim 11, wherein the transmission unit transmits, in a case where a portion of the object displayed on the screen of the image processing apparatus has been moved by the drag operation so that an area thereof becomes smaller than a predetermined area with respect to an entire area of the object, the information indicating the first compass direction in which the object has been moved.

13. The information processing apparatus according to claim 11, wherein the transmission unit transmits the information indicating the first compass direction in which the object has been moved, in a case where, after the object has been moved to an edge of the screen of the information processing apparatus by the drag operation, a drag operation to further push out the object is input so that the object is moved until an area thereof becomes smaller than a predetermined area,.

14. A non-transitory computer-readable storage medium storing a computer-executable program read and executed by a computer to cause the computer to operate as the information processing apparatus according to claim 1.

15. An information processing system including a transmitting apparatus and a receiving apparatus configured to transmit and receive an object according to an operation for moving the object displayed on a screen,
wherein the transmitting apparatus comprising:
a position detection unit configured to detect a designation position designated on a screen of the transmitting apparatus;
a determination unit configured to determine, based on a change in a designation position detected by the position detection unit, an operation direction in which the object displayed on the screen of the transmitting apparatus is moved;
a geomagnetism detection unit configured to detect geomagnetism;
an obtaining unit configured to obtain information on a compass direction in which the screen of the transmitting apparatus has been directed to;
a transmission unit configured to identify, based on the operation direction determined by the determination unit and the information indicating the compass direction to which the screen of the information processing apparatus has been directed obtained by the obtaining unit, information indicating a compass direction to which the object displayed on the screen of the information processing apparatus has been moved and transmit the identified information to the receiving apparatus; and
a display control unit configured to display on the screen of the transmitting apparatus, the object moving to disappear towards outside the screen along the operation direction determined by the determination unit, and
wherein the receiving apparatus comprising:
a receiving unit configured to receive the information indicating the compass direction in which the object has been moved;
a detection unit configured to detect geomagnetism;
an obtaining unit configured to obtain information indicating a compass direction to which a screen of the receiving apparatus has been directed, the compass direction being an absolute direction identified based on information on geomagnetism; and
a display control unit configured to cause, based on the information indicating the compass direction received by the receiving unit and the information indicating the compass direction the screen of the receiving apparatus has been directed to obtained by the obtaining unit, an object which is the same as an object displayed on a screen of the transmitting apparatus to appear from a compass direction which is opposite of the compass direction the object displayed on the screen of the transmitting apparatus has been moved in, in the screen of the receiving apparatus.

16. The information processing system according to claim 15, wherein the transmission unit of the transmitting apparatus transmits information indicating a portion of an object displayed on the screen of the transmitting apparatus which has disappeared from the screen of the transmitting apparatus caused by the object being moved, wherein the receiving unit of the receiving apparatus receives the information indicating the portion of the object which has disappeared from the screen of the transmitting apparatus, and wherein the display control unit in the receiving apparatus causes the portion of the object which has disappeared from the screen of the transmitting apparatus to appear on the screen of the receiving apparatus.

17. The information processing system according to claim 15, wherein a position in the screen of the receiving apparatus at which the object appears corresponds to a position at an opposite angle with respect to a position at which the object has disappeared from the screen of the transmitting apparatus.

18. A method of controlling an information processing apparatus configured to receive information indicating a first compass direction in which an object displayed on a screen has been moved, from another apparatus that transmits the information, the method comprising:

receiving the information indicating the first compass direction in which the object has been moved;

detecting geomagnetism;

obtaining information indicating a second compass direction to which a screen of the information processing apparatus has been directed, the first and second compass directions being absolute directions identified based on information on the detected geomagnetism; and causing, based on the received information indicating the first compass direction and the obtained information indicating the second compass direction to which the screen of the information processing apparatus has been directed, an object which is the same as an object displayed on a screen of the other apparatus to appear from a compass direction opposite of the first compass direction in which the object displayed on the screen of the other apparatus has been moved, in the screen of the information processing apparatus.

\* \* \* \* \*